US011334948B2

(12) United States Patent
Lard et al.

(10) Patent No.: US 11,334,948 B2
(45) Date of Patent: May 17, 2022

(54) COMPUTER-BASED PLATFORMS CONFIGURED TO ADMINISTER SOFTWARE OBJECTS DESIGNED TO ALLOW USERS TO ADMINISTER BUNDLES OF DIGITAL ASSETS AND METHODS OF USE THEREOF

(71) Applicant: Charles Schwab & Company, Inc., San Francisco, CA (US)

(72) Inventors: Todd Lard, San Francisco, CA (US); Sridhar Inukurti, San Francisco, CA (US); Paul Simbi, San Francisco, CA (US); Tanveer Ansari, San Francisco, CA (US); Gangadhar Pentakota, San Francisco, CA (US); Connor Noonan, San Francisco, CA (US); Chris Morrell, San Francisco, CA (US); Uriel Santiago, San Francisco, CA (US); Lara Andrews, San Francisco, CA (US)

(73) Assignee: Charles Schwab & Company, Inc., San Francisco, CA (US)

( * ) Notice: Subject to any disclaimer, the term of this patent is extended or adjusted under 35 U.S.C. 154(b) by 0 days.

(21) Appl. No.: 16/720,547

(22) Filed: Dec. 19, 2019

(65) Prior Publication Data

US 2021/0125284 A1    Apr. 29, 2021

Related U.S. Application Data

(63) Continuation of application No. 16/662,769, filed on Oct. 24, 2019, now abandoned.

(51) Int. Cl.
*G06Q 40/06* (2012.01)
*G06Q 30/06* (2012.01)
(Continued)

(52) U.S. Cl.
CPC ......... *G06Q 40/06* (2013.01); *G06F 16/9035* (2019.01); *G06Q 20/363* (2013.01); *G06Q 30/0631* (2013.01)

(58) Field of Classification Search
CPC .. G06Q 40/06; G06Q 20/363; G06Q 30/0631; G06F 16/9035
See application file for complete search history.

(56) References Cited

U.S. PATENT DOCUMENTS 6,601,044 B1   7/2003   Wallman
8,275,690 B2   9/2012   Wallman
(Continued)

OTHER PUBLICATIONS

White, Ron, How Computers Work, 9th Ed., Que Corporation, Nov. 14, 2007 (Year: 2007).*
(Continued)

*Primary Examiner* — Scott C Anderson
*Assistant Examiner* — James H Miller
(74) *Attorney, Agent, or Firm* — Greenberg Traurig, LLP

(57) ABSTRACT

In order to produce fractional digital assets, systems and methods include displaying a digital assets bundle ordering graphical user interface. Receiving user-specific bundle data including digital assets. Allocating a notional purchase amount among the digital assets based on an allocation. Determining, from external marketplaces, numbers of whole ownership units of each digital asset based on the notional purchase amount allocated to each digital asset. Electronically executing purchases of each number of whole ownership units of each digital asset to store in firm account data in a firm account of an asset-tracking database. Determining a user-specific ownership fraction in each number of whole ownership units based on the notional purchase amount allocated to each digital asset. Generating an allocation link between each firm account data of the whole ownership (Continued)

units and user-account data of each user-specific ownership fraction. Tracking the user-specific ownership fractions based on the allocation links.

18 Claims, 12 Drawing Sheets

(51) Int. Cl.
*G06F 16/9035* (2019.01)
*G06Q 20/36* (2012.01)

(56) References Cited

U.S. PATENT DOCUMENTS

| | | | | |
|---|---|---|---|---|
| 8,595,116 | B1* | 11/2013 | Bettinger, II | G06Q 40/04 705/36 R |
| 2004/0002913 | A1* | 1/2004 | Breen | G06Q 40/04 705/37 |
| 2010/0205110 | A1* | 8/2010 | Wallman | G06Q 40/00 705/36 R |
| 2012/0203681 | A1* | 8/2012 | Lele | G06Q 40/00 705/37 |
| 2013/0117156 | A1* | 5/2013 | Azmi | G06Q 40/08 705/26.35 |
| 2013/0117181 | A1* | 5/2013 | Isaacson | G06Q 30/0224 705/41 |
| 2014/0081839 | A1* | 3/2014 | Blackhurst | G06Q 20/227 705/39 |
| 2014/0189161 | A1* | 7/2014 | Renalds | G06Q 40/04 709/246 |
| 2015/0262301 | A1* | 9/2015 | Lele | G06Q 40/00 705/37 |
| 2016/0350836 | A1* | 12/2016 | Burns | G06Q 30/0625 |
| 2018/0225759 | A1* | 8/2018 | van Stolk | G06Q 40/06 |

OTHER PUBLICATIONS

McKenna, Beth "Are Stock Gift Cards o your Giving List?" (Year: 2015).*
McKenna, Beth "Are Stock Gift Cards on your Giving List?" (Year: 2015).*
McKenna, Beth "Are Stock Gft Cards on your Giving List?" (2015) (Year: 2015).*

* cited by examiner

| 1. Select Stocks | 2. Choose Amount | 3. Review Order | 4. Order Recieved |

Schwab Stock Bundles

A simple way to buy shares in several companies at once.

Current Selection (1)

Select 3 to 10 stocks for your bundle. Choose from the list of stocks offered or filter by industry.

By using the Schwab Stock Bundles feature, you agree to the following Terms and Conditions, which include important information about how Schwab Stock Bundles work. Learn about out Schwab's eligibility criteria and industry-based filters.

As of 11:45AM ET, 07/02/2019

137 stocks available

| Industries | Symbol | ▼ Name | Last Price |
|---|---|---|---|
| View All Available | ☐ ABT | Abbott Laboratories | $79.66 |
| Auto & Airlines | ☐ ABBV | AbbVie Inc | $80.78 |
| Biotech & Pharma | ☐ ATVI | Activision Blizzard Inc | $47.12 |
| Entertainment | ☐ AMD | Advanced Micro Devices Inc | $26.36 |
| Financial Services | ☐ AABA | Altaba Inc | $73.63 |
| Food, Hotels, & Leisure | ☐ ATUS | Altica USA Inc | $22.03 |
| Healthcare | ☐ MO | Altria Group Inc | $57.73 |
| High Tech Hardware | ☐ AMZN | Amazon.com Inc | $1814.19 |
| IT Services & Software | ☐ AAL | American Airlines Group Inc | $32.35 |
| Oil & Gas | ☐ AIG | American International Group Inc | $43.99 |
| Retail | ☐ APC | Anadarko Petroleum Corp | $45.99 |
| Utilities | ☐ AAPL | Apple Inc | $191.24 |
| More Industries | ☐ AMAT | Applied Materials Inc | $41.13 |
|  | ☐ T | AT&T Inc | $31.95 |
|  | ☐ EQH | Axa Equitable Holdings Inc | $20.88 |
|  | ☐ BHGE | Baker Hughes A GE Co | $27.84 |
|  | ☐ BAC | Bank of America Corp | $28.54 |
|  | ☐ BK | Bank of New York Mellon Corp | $51.46 |
|  | ☐ BBT | BB&T Corp | $48.02 |
|  | ☐ BIIB | Biogen Inc | $232.49 |
|  | ☐ BA | Boeing Co | $391.54 |
|  | ☐ BSX | Boston Scientific Corp | $38.66 |
|  | ☐ BMY | Bristol-Myers Squibb Co | $47.09 |
|  | ☐ COG | Cabot Oil & Gas Corp | $25.87 |
|  | ☐ CCL | Carnival Corp | $52.19 |

| 1. Select Stocks | 2. Choose Amount | 3. Review Order | 4. Order Recieved |

Schwab Stock Bundles
A simple way to buy shares in several companies at once.

Current Selection (3)
| DAL Delta Air Lines Inc × | LUV Southwest Airlines... × | TSLA Tesla Inc × |

Select 3 to 10 stocks for your bundle. Choose from the list of stocks offered or filter by industry.
By using the Schwab Stock Bundles feature, you agree to the following Terms and Conditions, which include important information about how Schwab Stock Bundles work. Learn about out Schwab's eligibility criteria and industry-based filters.

As of 11:45AM ET, 07/02/2019

137 stocks available

| Industries | | Symbol | Name | Last Price |
|---|---|---|---|---|
| View All Available | ☐ | AAL | American Airlines Group Inc | $32.35 |
| Auto & Airlines | ☐ | BA | Boeing Co | $391.54 |
| Biotech & Pharma | ☑ | DAL | Delta Air Lines Inc | $52.18 |
| Entertainment | ☐ | GM | General Motors Co | $37.76 |
| Financial Services | ☑ | LUV | Southwest Airlines Co | $52.41 |
| Food, Hotels, & Leisure | ☑ | TSLA | Tesla Inc | $289.18 |
| Healthcare | | | | |
| High Tech Hardware | | | | |
| IT Services & Software | | | | |
| Oil & Gas | | | | |
| Retail | | | | |
| Utilities | | | | |
| More Industries | | | | |

| 1. Select Stocks » | 2. Choose Amount » | 3. Review Order » | 4. Order Recieved |

Order Summary  As of 11:45AM ET,07/02/2019
Account | Order Amount | Number of Orders
Individual - ...0230 | $500 | 3

Order Messages
1. The market is now closed. This order will be placed the next trading day. (AC 165)
2. Dividends will be reinvested. (Oc600)
3. The market is now closed. This order will be placed for the next trading day. (DO294)
4. This order will be entered for the next standard market session and will NOT be entered in the Extended Hours Trading session. Please be aware that because of extended hours trading activity, this quota is subjected change. (DO667)
5. Please Note: Special offers are not reflected in the Estimated Amount or Estimated Commission. (WB25041)

Order 1

DAL  Buy $166.67 @ Market, Day Only
Reinvest Dividends: No
Delta Air Lines Inc

| | | | Amount | $166.67 |
| $52.18 | Bid/Size | 49.67/1 | Commission: | $0.00 |
| +2.2325(+0.45%) | Ask/Size | 54.79/1 | Estimated Total Shares: | 3.1941 |

Order Messages
1. The market is now closed. This order will be placed the next trading day. (AC 165)
2. Dividends will be reinvested. (Oc600)
3. The market is now closed. This order will be placed for the next trading day. (DO294)
4. This order will be entered for the next standard market session and will NOT be entered in the Extended Hours Trading session. Please be aware that because of extended hours trading activity, this quota is subjected change. (DO667)
5. Please Note: Special offers are not reflected in the Estimated Amount or Estimated Commission. (WB25041)

Order 2

LUV  Buy $166.67 @ Market, Day Only
Reinvest Dividends: No
Southwest Airlines Co

| | | | Amount | $166.67 |
| $52.41 | Bid/Size | 49.78/1 | Commission: | $0.00 |
| +2.2325(+0.45%) | Ask/Size | 55.03/1 | Estimated Total Shares: | 3.1801 |

Order Messages
1. The market is now closed. This order will be placed the next trading day. (AC 165)
2. Dividends will be reinvested. (Oc600)
3. The market is now closed. This order will be placed for the next trading day. (DO294)
4. This order will be entered for the next standard market session and will NOT be entered in the Extended Hours Trading session. Please be aware that because of extended hours trading activity, this quota is subjected change. (DO667)
5. Please Note: Special offers are not reflected in the Estimated Amount or Estimated Commission. (WB25041)

Order 3

TSLA  Buy $166.67 @ Market, Day Only
Reinvest Dividends: No
Tesla Inc

| | | | Amount | $166.67 |
| $289.18 | Bid/Size | 274.72/1 | Commission: | $0.00 |
| +2.2325(+0.45%) | Ask/Size | 303.64/1 | Estimated Total Shares: | 0.5763 |

Order Messages
1. The market is now closed. This order will be placed the next trading day. (AC 165)
2. Dividends will be reinvested. (Oc600)
3. The market is now closed. This order will be placed for the next trading day. (DO294)
4. This order will be entered for the next standard market session and will NOT be entered in the Extended Hours Trading session. Please be aware that because of extended hours trading activity, this quota is subjected change. (DO667)
5. Please Note: Special offers are not reflected in the Estimated Amount or Estimated Commission. (WB25041)

Before placing this order, please verify that the order information is correct and that you have read your order messages.

Estimated Total Amount
$500.00

[ Do Not Place Order ]  [ Change ]  [ Place Order ]

FIG. 5C

| 1. Select Stocks | 2. Choose Amount | 3. Review Order | 4. Order Recieved |

✓ Thank you. We have received your order.

Order Summary

| Account | Order Amount | Date | Commission |
|---|---|---|---|
| Individual - ...0230 | $500 | July 16, 2019 | $0.00 |

Order 1     Buy $33.33 DAL Shares @ Market

Reinvest Dividends: No     #6079638

Order 2     Buy $33.33 LUV Shares @ Market

Reinvest Dividends: No     #6079639

Order 3     Buy $33.33 TSLA Shares @ Market

Reinvest Dividends: No     #6079640

[ Transfer Funds ] [ Order Status ]

FIG. 5D

COMPUTER-BASED PLATFORMS CONFIGURED TO ADMINISTER SOFTWARE OBJECTS DESIGNED TO ALLOW USERS TO ADMINISTER BUNDLES OF DIGITAL ASSETS AND METHODS OF USE THEREOF

RELATED APPLICATIONS

This application is a continuation of U.S. patent application Ser. No. 16/662,769, filed Oct. 24, 2019, entitled "COMPUTER-BASED PLATFORMS CONFIGURED TO ADMINISTER SOFTWARE OBJECTS DESIGNED TO ALLOW USERS TO ADMINISTER BUNDLES OF DIGITAL ASSETS AND METHODS OF USE THEREOF", the entirety of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Charles Schwab & Co. Inc., All Rights Reserved.

FIELD OF TECHNOLOGY

The present disclosure generally relates to computer-based platforms configured to administer software objects designed to allow users to generate, transfer, utilize and administer bundles of digital assets and methods of use thereof.

BACKGROUND OF TECHNOLOGY

A computer network platform may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

The present disclosure includes an illustrative embodiment of a computer-based method having steps including causing to display, by the at least one processor of the digital assets bundle ordering platform, a digital assets bundle ordering graphical user interface on a screen of a computing device associated with a user, where the digital assets bundle ordering graphical user interface includes a plurality of graphical user elements that are configured to allow the user to identify user-specific bundle data that includes: i) a bundle of digital assets that the user desires to purchase, ii) a notional purchase amount that the user desires to spend for purchasing for the bundle, and iii) an allocation of the notional purchase amount among digital assets of the bundle; where the bundle of digital assets includes: 1) a first digital asset of a first asset type including a first digital representation of a first tradable asset, 2) a second digital asset of a second asset type including a second digital representation of a second tradable asset, and 3) a third digital asset of a third asset type including a third digital representation of a third tradable asset. Receiving, by the at least one processor of the digital assets bundle ordering platform, the user-specific bundle data. Allocating, by the at least one processor, the notional purchase amount among the first digital asset, the second digital asset, and the third digital asset, based on the allocation of the notional purchase amount among the digital assets of the bundle. Electronically communicating, by the at least one processor, with at least one first external marketplace selling the first digital asset to determine a first number of whole ownership units of the first digital asset based on a respective portion of the notional purchase amount allocated to the first digital asset. Electronically communicating, by the at least one processor, with at least one second external marketplace selling the second digital asset to determine a second number of whole ownership units of the second digital asset based on a respective portion of the notional purchase amount allocated to the second digital asset. Electronically communicating, by the at least one processor, with at least one third external marketplace selling the third digital asset to determine a third number of whole ownership units of the third digital asset based on a respective portion of the notional purchase amount allocated to the third digital asset. Electronically causing, by the at least one processor, to execute at least one first purchase order to purchase the first number of whole ownership units of the first digital asset. Electronically causing, by the at least one processor, to execute at least one second purchase order to purchase the second number of whole ownership units of the second digital asset. Electronically causing, by the at least one processor, to execute at least one third purchase order to purchase the third number of whole ownership units of the third digital asset. Storing, by the at least one processor, in a firm account of at least one asset-tracking database, a first firm account data of the first number of whole ownership units of the first digital asset, a second firm account data of the second number of whole ownership units of the second digital asset, and a third firm account data of the third number of whole ownership units of the third digital asset. Determining, by the at least one processor, a first user-specific ownership fraction in the first number of whole ownership units of the first digital asset based on the respective portion of the notional purchase amount allocated to the first digital asset. Determining, by the at least one processor, a second user-specific ownership fraction in the second number of whole ownership units of the second digital asset based on the respective portion of the notional purchase amount allocated to the second digital asset. Determining, by the at least one processor, a third user-specific ownership fraction in the third number of whole ownership units of the third digital asset based on the respective portion of the notional purchase amount allocated to the third digital asset. Generating, by the at least one processor, a first asset-specific updatable allocation link between the first firm account data of the first number of whole ownership units of the first digital asset in the firm account and a first user-account data of the first user-specific ownership fraction in the first number of whole ownership units of the first digital asset in a user account of the user. Generating, by the at least one processor, a second asset-specific updatable allocation link between the second firm account data of the second number of whole ownership units of the second digital asset in the firm account and a second user-account data of the second user-specific ownership fraction in the second number of whole ownership units of the second digital asset in a user account of the user. Generating, by the at least one processor, a third asset-specific updatable allocation link between the third firm account data of the third number of whole ownership units of the third digital asset in the firm account and a third user-account data of the third user-specific ownership fraction in the third number of whole ownership units of the third digital asset in a user account of the user. Tracking, by the at least one processor, the first user-specific ownership fraction in the first number of whole ownership units of the first digital asset based on the first asset-specific updatable allocation link. Tracking, by the at least one processor, the second user-specific ownership fraction in the second number of whole ownership units of the second digital asset based on the second asset-specific updatable allocation link, and tracking, by the at least one processor, the third user-specific ownership fraction in the third number of whole ownership units of the third digital asset based on the third asset-specific updatable allocation link.

The present disclosure includes an illustrative embodiment of a non-transitory computer readable medium having stored thereon software instructions that, when executed by a processor, cause the processor to generate control signals for executing the steps including causing to display, by the at least one processor of the digital assets bundle ordering platform, a digital assets bundle ordering graphical user interface on a screen of a computing device associated with a user, where the digital assets bundle ordering graphical user interface includes a plurality of graphical user elements that are configured to allow the user to identify user-specific bundle data that includes: i) a bundle of digital assets that the user desires to purchase, ii) a notional purchase amount that the user desires to spend for purchasing for the bundle, and iii) an allocation of the notional purchase amount among digital assets of the bundle; where the bundle of digital assets includes: 1) a first digital asset of a first asset type including a first digital representation of a first tradable asset, 2) a second digital asset of a second asset type including a second digital representation of a second tradable asset, and 3) a third digital asset of a third asset type including a third digital representation of a third tradable asset. Receiving, by the at least one processor of the digital assets bundle ordering platform, the user-specific bundle data. Allocating, by the at least one processor, the notional purchase amount among the first digital asset, the second digital asset, and the third digital asset, based on the allocation of the notional purchase amount among the digital assets of the bundle. Electronically communicating, by the at least one processor, with at least one first external marketplace selling the first digital asset to determine a first number of whole ownership units of the first digital asset based on a respective portion of the notional purchase amount allocated to the first digital asset. Electronically communicating, by the at least one processor, with at least one second external marketplace selling the second digital asset to determine a second number of whole ownership units of the second digital asset based on a respective portion of the notional purchase amount allocated to the second digital asset. Electronically communicating, by the at least one processor, with at least one third external marketplace selling the third digital asset to determine a third number of whole ownership units of the third digital asset based on a respective portion of the notional purchase amount allocated to the third digital asset. Electronically causing, by the at least one processor, to execute at least one first purchase order to purchase the first number of whole ownership units of the first digital asset. Electronically causing, by the at least one processor, to execute at least one second purchase order to purchase the second number of whole ownership units of the second digital asset. Electronically causing, by the at least one processor, to execute at least one third purchase order to purchase the third number of whole ownership units of the third digital asset. Storing, by the at least one processor, in a firm account of at least one asset-tracking database, a first firm account data of the first number of whole ownership units of the first digital asset, a second firm account data of the second number of whole ownership units of the second digital asset, and a third firm account data of the third number of whole ownership units of the third digital asset. Determining, by the at least one processor, a first user-specific ownership fraction in the first number of whole ownership units of the first digital asset based on the respective portion of the notional purchase amount allocated to the first digital asset. Determining, by the at least one processor, a second user-specific ownership fraction in the second number of whole ownership units of the second digital asset based on the respective portion of the notional purchase amount allocated to the second digital asset. Determining, by the at least one processor, a third user-specific ownership fraction in the third number of whole ownership units of the third digital asset based on the respective portion of the notional purchase amount allocated to the third digital asset. Generating, by the at least one processor, a first asset-specific updatable allocation link between the first firm account data of the first number of whole ownership units of the first digital asset in the firm account and a first user-account data of the first user-specific ownership fraction in the first number of whole ownership units of the first digital asset in a user account of the user. Generating, by the at least one processor, a second asset-specific updatable allocation link between the second firm account data of the second number of whole ownership units of the second digital asset in the firm account and a second user-account data of the second user-specific ownership fraction in the second number of whole ownership units of the second digital asset in a user account of the user. Generating, by the at least one processor, a third asset-specific updatable allocation link between the third firm account data of the third number of whole ownership units of the third digital asset in the firm account and a third user-account data of the third user-specific ownership fraction in the third number of whole ownership units of the third digital asset in a user account of the user. Tracking, by the at least one processor, the first user-specific ownership fraction in the first number of whole ownership units of the first digital asset based on the first asset-specific updatable allocation link. Tracking, by the at least one processor, the second user-specific ownership fraction in the second number of whole ownership units of the second digital asset based on the second asset-specific updatable allocation link, and tracking, by the at least one processor, the third user-specific ownership fraction in the third number of whole ownership units of the third digital asset based on the third asset-specific updatable allocation link.

The present disclosure includes an illustrative embodiment of a computer-based platform and/or system having components including at least one asset-tracking database, including a firm account for tracking tradeable assets, and at least one processor in communication with the at least one asset-tracking database. Where the at least one processor is configured to: cause to display a digital assets bundle ordering graphical user interface on a screen of a computing device associated with a user; where the digital assets bundle ordering graphical user interface includes a plurality of graphical user elements that are configured to allow the user to identify user-specific bundle data that includes: i) a bundle of digital assets that the user desires to purchase, ii) a notional purchase amount that the user desires to spend for purchasing for the bundle, and iii) an allocation of the notional purchase amount among digital assets of the bundle; where the bundle of digital assets includes: 1) a first digital asset of a first asset type including a first digital representation of a first tradable asset, 2) a second digital asset of a second asset type including a second digital representation of a second tradable asset, and 3) a third digital asset of a third asset type including a third digital representation of a third tradable asset; receive the user-specific bundle data; allocate the notional purchase amount among the first digital asset, the second digital asset, and the third digital asset, based on the allocation of the notional purchase amount among the digital assets of the bundle; electronically communicate with at least one first external marketplace selling the first digital asset to determine a first number of whole ownership units of the first digital asset based on a respective portion of the notional purchase amount allocated to the first digital asset; electronically communicate with at least one second external marketplace selling the second digital asset to determine a second number of whole ownership units of the second digital asset based on a respective portion of the notional purchase amount allocated to the second digital asset; electronically communicate with at least one third external marketplace selling the third digital asset to determine a third number of whole ownership units of the third digital asset based on a respective portion of the notional purchase amount allocated to the third digital asset; electronically cause to execute at least one first purchase order to purchase the first number of whole ownership units of the first digital asset; electronically cause to execute at least one second purchase order to purchase the second number of whole ownership units of the second digital asset; electronically cause to execute at least one third purchase order to purchase the third number of whole ownership units of the third digital asset; store in an firm account of at least one asset-tracking database, a first firm account data of the first number of whole ownership units of the first digital asset, a second firm account data of the second number of whole ownership units of the second digital asset, and a third firm account data of the third number of whole ownership units of the third digital asset; determine a first user-specific ownership fraction in the first number of whole ownership units of the first digital asset based on the respective portion of the notional purchase amount allocated to the first digital asset; determine a second user-specific ownership fraction in the second number of whole ownership units of the second digital asset based on the respective portion of the notional purchase amount allocated to the second digital asset; determine a third user-specific ownership fraction in the third number of whole ownership units of the third digital asset based on the respective portion of the notional purchase amount allocated to the third digital asset; generate a first asset-specific updatable allocation link between the first firm account data of the first number of whole ownership units of the first digital asset in the firm account and a first user-account data of the first user-specific ownership fraction in the first number of whole ownership units of the first digital asset in a user account of the user; generate a second asset-specific updatable allocation link between the second firm account data of the second number of whole ownership units of the second digital asset in the firm account and a second user-account data of the second user-specific ownership fraction in the second number of whole ownership units of the second digital asset in a user account of the user; generate a third asset-specific updatable allocation link between the third firm account data of the third number of whole ownership units of the third digital asset in the firm account and a third user-account data of the third user-specific ownership fraction in the third number of whole ownership units of the third digital asset in a user account of the user; track the first user-specific ownership fraction in the first number of whole ownership units of the first digital asset based on the first asset-specific updatable allocation link; track the second user-specific ownership fraction in the second number of whole ownership units of the second digital asset based on the second asset-specific updatable allocation link; and track the third user-specific ownership fraction in the third number of whole ownership units of the third digital asset based on the third asset-specific updatable allocation link.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-9 show one or more schematic flow diagrams, certain computer-based architectures, and/or screenshots of various specialized graphical user interfaces which are illustrative of some exemplary aspects of at least some embodiments of the present disclosure.

DETAILED DESCRIPTION

Figure 1:
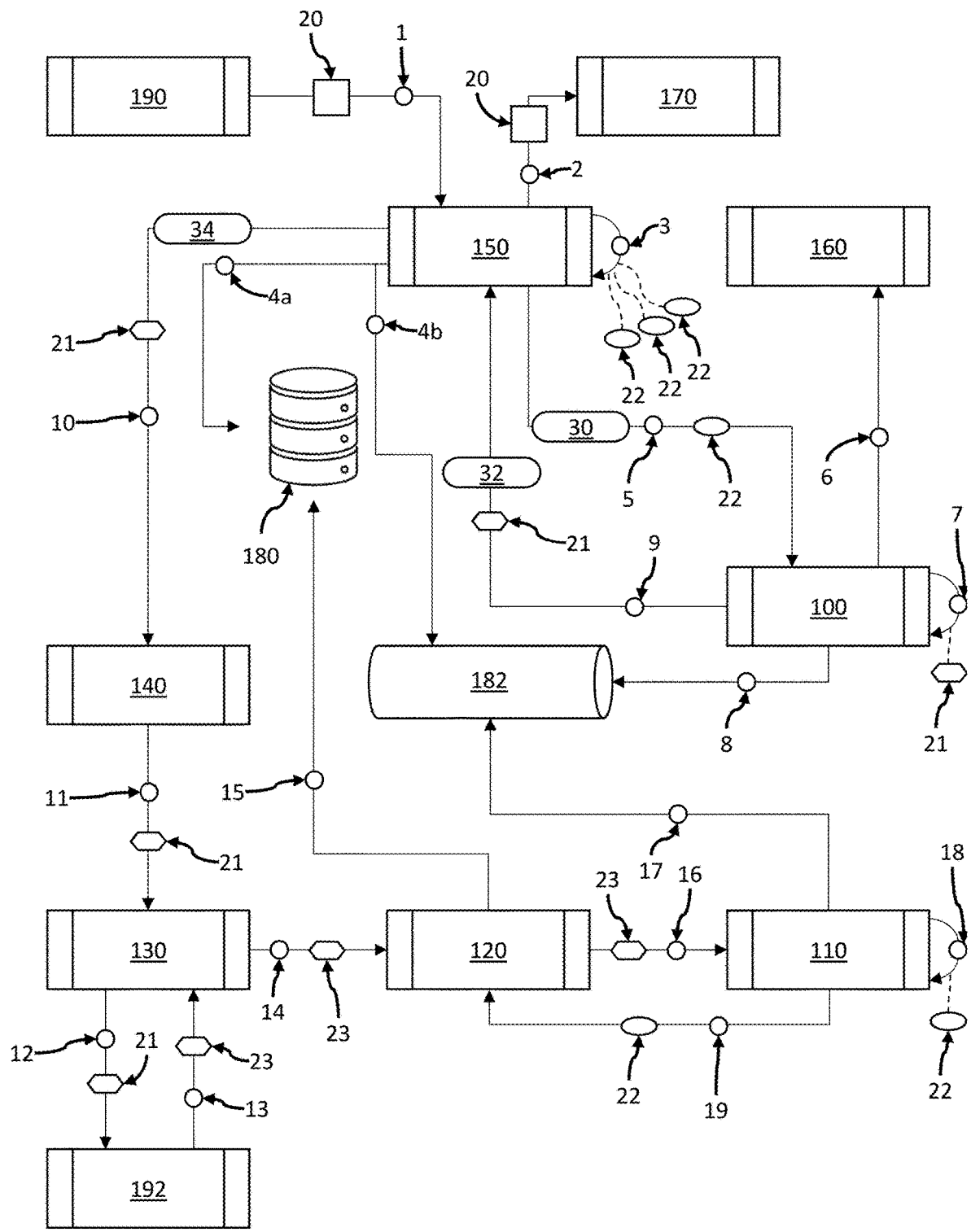

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 68000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems and platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems and platforms of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems and platforms of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems and platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems and platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems and platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems and platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems and platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, users can be traders, representing physical end users, custodians, hedge funds, and/or proprietary algorithmic trade execution firms.

FIGS. 1 through 9 illustrate systems and methods of database and system communication to parse requests and dynamically allocate fulfillment of the request across databases. The following embodiments provide technical solutions and/or technical improvements that overcome technical problems, drawbacks and/or deficiencies in the technical fields involving request routing across databases and services to reconcile differences between the request and the results. As explained in more detail, below, technical solutions and/or technical improvements herein include aspects of improved database communication across a platform of computer-based services directing and delivering instructions to fulfill a request for a fractional data object by dynamically allocating fractions of the data object to multiple databases. Based on such technical features, further technical benefits become available to users and operators of these systems and methods. Moreover, various practical applications of the disclosed technology are also described, which provide further practical benefits to users and operators that are also new and useful improvements in the art.

As discussed herein, digital assets may include, but are not limited to, digital representations of assets including cryptocurrencies.

FIG. 1 is a block diagram of an exemplary computer-based digital assets bundle ordering platform for purchasing and administering a bundle of digital assets in accordance with one or more embodiments of the present disclosure. In some embodiments, each bundle of fractional digital assets includes at least two positions in corresponding digital assets where a respective value of each respective position is not equal to a whole number multiplier of a unit of a digital asset. For example, when the digital asset is a stock, a unit of the stock would be a single share. Thus, the fractional digital asset position is, for example, a position having a fraction of the single share (e.g., 0.5 share, 1.2 share, etc.).

In some embodiments, digital assets may include, but not limited to, digital representations or digitized versions of, individual stocks, mutual funds, bonds, cash (currency), cryptocurrency, commodities, derivatives, or any tradeable asset, including contracts based on the value of any of the foregoing.

In some embodiments, an exemplary fractional assets administrative computer platform may be configured to receive a bundle order 20 from a user and administer the bundle order with a series of services. Herein, the term "service" refers to software and/or computer hardware, such as, processors, memory devices, storage devices, communication devices, and software engines, among other components. For example, the services can include one or more of the server device A 704 and server device B 713, as described below with reference to FIG. 7. The services may include: an order aggregation service 100, an internal execution service 110, an order posting service 120, a fix gateway 130, an order routing service 140, an order entry service 150, a market data service 160, a credit and risk service 170, among other services. In some embodiments, each of the services may comprise respective hardware resources, such as, processors, memory devices, storage devices, communication devices, among other components. In some embodiments, each of the services may share hardware resources, e.g., as virtual machines in a cloud environment, through scheduling tasks associated with each of the services on centralized or distributed hardware associated, or other configurations of shared resources, independent resources, or combinations thereof.

Electronic trading venues, such as the New York Tradable assets Exchange, may regulate the order submission process for buying and selling securities. In some embodiments, each trading venue can have its own set of rules, protocols, and processes that its participant/customer, such as a broker or a dealer, must follow to execute buy/sell orders via that trading venue. For instance, the exemplary trading venue may require transforming buy/sell orders to meet its specific rules, protocols, and processes of the trading venue prior to submitting those orders for execution.

However, in some trading venues, to administer a diversified portfolio of individual tradable assets, a retail, non-professional, investor would have to purchase, for example, five to twenty-five tradable assets, and re-balance the portfolio periodically as the market condition change. Such retail investor may incur brokerage costs that would discourage the retail investor from investing in the first place. For example, a person who would like to invest small amounts ($20-$50) a month per each of 10 tradable assets (e.g., stock) would likely incur transaction costs that would be considerable compare to the investment amount. Further, ordinary people are more likely to associate higher returns with a need to invest considerable amounts (in thousands) to extract financial benefit of owning tradable assets. Thus, retail investors with limited funds to invest may prefer to invest into tradable assets whose prices would be lower, reducing choices for picking tradable assets.

Moreover, people may also associate the process of investing, even when utilizing electronic brokerage applications, to be rather complex and not readily accessible for ordinary people.

Embodiments of the fractional assets administrative computer platform may overcome these challenges utilizing, e.g., digital assets and transformation of bundle orders 20 of digital assets into fractional digital assets that easy to acquire and transfer via an illustrative computer platform. In some embodiments, the exemplary computer-based platform for purchasing and administering bundles of fractional digital assets may transform the bundle order 20 into multiple client orders 21 that may be executed in accordance with rules of each particular trading venue. For example, an exemplary bundle order 20 may include buy instructions to buy 1.3 share of IBM and 0.5 share of Microsoft. In some embodiments the exemplary computer-based platform for purchasing and administering bundles of fractional digital assets may be configured to first split such bundle order 20 into two separate client orders 21. However, both client orders 21 (fractional IMB and Microsoft buy orders) would not be executable by, for example, a traditional stock trading venue or exchange because electronic orders accepted by such venues require buy order to buy multiples of entire share (e.g., 1 IBM share, 2 IBM share, etc.). In some embodiments, to overcome such technical requirement by the traditional trading venues, the exemplary computer-based platform for purchasing and administering bundles of fractional digital assets may utilize the services to leverage a centralized account database and a centralized event sourcing record to reconcile fractional orders to allocate a fraction amount of a unit of each trading asset to the user. In some embodiments, the exemplary computer-based platform for purchasing and administering a bundle of fractional digital assets may maintain compatibility with external ($3^{rd}$ party) trading systems and/or venues, while concurrently providing users with direct ownership of fractional amounts of digital assets.

In some embodiments, the exemplary inventive computer-based platform for purchasing and administering bundles of fractional digital assets include a step 1 to receive a client/user's bundle order 20 submitted from a client channel 190 to an order entry service 150. The order entry service 150 can include, e.g., a module formed of a combination of software and/or hardware, including, e.g., a processing device, a memory device, a storage device, one or more sets of software instructions, among other components and combinations thereof. In some embodiments, the client channel 190 can include, e.g., a specifically programmed graphical user interface configured to allow users to explore, construct, and order bundle orders 20. For example, the client channel 190 can include, e.g., a connection to a user device, including, e.g., a laptop, computer, smartphone, tablet or other computing device. In some embodiments, the user device includes, e.g., a web browser for accessing an online tool for bundle order 20 creation and purchase. In some embodiments, the user device may run, e.g., a software client application for bundle order 20 creation and purchase that would communicate with the exemplary inventive computer-based platform for purchasing and administering bundles of fractional digital assets. Other embodiments for access the exemplary inventive platform via a client channel 190 are also contemplated.

In some embodiments, the exemplary inventive computer-based platform for purchasing and administering bundles of fractional digital assets may be programmed to allow the user to create an order for a bundle order 20 of digital assets for a selected notional amount of money. In some embodiments, an exemplary bundle order 20 may include, e.g., sets of digital assets such as stocks. For example, the bundle order 20 can include a predetermined or user determined set of stocks. In some embodiments, the exemplary inventive computer-based platform for purchasing and administering bundles of fractional digital assets may be programmed to allow the user to select any suitable number of digital assets into a bundle. For example, the bundle order 20 can include, e.g., between about 3 and about 10 digital assets, such as, stocks. For example, the bundle order 20 can include, e.g., between about 3 and about 50 digital assets, such as, stocks. For example, the bundle order 20 can include, e.g., between about 3 and about 100 digital assets, such as, stocks. For example, the bundle order 20 can include, e.g., between about 25 and about 50 digital assets, such as, stocks.

In some embodiments, at least some or all positions in each bundle may be in the form of fractional values of investment units of respective digital assets. For example, as detailed herein, an exemplary bundle order 20 may include: 1.3 shares of IBM, 0.2 share of Microsoft, 0.1 share of Oracle, and 2.5 shares of Amazon.

In some embodiments, the exemplary inventive computer-based platform for purchasing and administering bundles of fractional digital assets may be programmed to allow the user to divide a particular investment amount equally or unequally among selected investment choices.

In some embodiments, the exemplary inventive computer-based platform for purchasing and administering bundles of fractional digital assets may be programmed to allow the user to select a bundle order 20 from a universe of one or more asset types, e.g., stocks, mutual funds, cryptocurrencies, exchange traded funds (ETFs), etc. For example, in some embodiments, the exemplary inventive computer-based platform for purchasing and administering bundles of fractional digital assets may be programmed to allow the user to select stock that meet one or more investment criteria. For investment criteria may include, e.g., without limitation, market capitalization (large and/or mid-cap), exchange listing, trading volume (10-day average of >4 million shares), and price (>$20), among others and combinations thereof.

In some embodiments, the exemplary inventive computer-based platform for purchasing and administering bundles of fractional digital assets may be programmed to allow the user to choose bundles according to themes. For example, "themes" may be based on the Morgan Stanley Capital International's (MSCI) Global Industry Classification Standard (GICS)™, and/or by other suitable methodology for grouping digital assets such as stocks. For example, themes may be based, at least in part, on, but not limited to, the MSCI's ESG (environmental, social and governance) Indexes™ or any other similar suitable third-party classification system that allows for themes that are more specific (e.g., "Green Energy") or more broad (e.g., "Made in America") than the GICS classifications can support. For example, there could be a "Banks" theme and an "Other Financials" theme, the latter consisting of stocks that are in the GICS Financials™ sector but not in the Banks sub-industry category. In some embodiments, the exemplary inventive computer-based platform for purchasing and administering bundles of fractional digital assets may be programmed to display themes via the client channel 190. In some embodiments, once the user selects a theme, the stocks in that theme may be displayed. In some embodiments, the user may then construct a bundle by selecting, e.g., at least three and not more than ten of those stocks. In other embodiments, users may construct a bundle order 20 by selecting any of the stocks from the universe of offered choices, by selecting stocks from selected theme(s) and/or by any other suitable categorizations. For example, in some embodiments, a user, such as, e.g., an investor, may choose any, e.g., three to ten stocks from the entire universe of stocks available for bundles regardless of theme (i.e., the aggregation of the stocks in each theme). In some embodiments, the exemplary inventive computer-based platform for purchasing and administering bundles of fractional digital assets may be programmed to allow the user to, first select a bundle and then customize the bundle by adding and/or removing specific digital assets, e.g., stocks.

In some embodiment, to facilitate reducing complexity and perceived barriers to directly investing in stocks, the exemplary inventive computer-based platform for purchasing and administering bundles of fractional digital assets may be programmed to allow users to purchase bundle orders 20 in notional amounts (e.g., notional U.S. dollar amounts) rather than in shares. For example, the user selects from a set of predetermined notional amount increments, e.g., displayed to the user via the client channel 190. In some embodiments, the predetermined notional amounts can include $50, $100, $250, $500, and $1,000, or other suitable amount. In some embodiments, the exemplary inventive computer-based platform for purchasing and administering bundles of fractional digital assets may be programmed to allow the user to in some embodiments select a notional amount in any whole dollar amount, not limited to the specified increments. In some embodiments, the notional amounts can have a maximum amount and a minimum amount, such as, e.g., a minimum of $100 and a maximum of $5000.

In some embodiments, the exemplary inventive computer-based platform for purchasing and administering bundles of fractional digital assets may be programmed to allow the user to gift the bundle order 20 or a notional amount represented by the bundle order 20 to a gift recipient (e.g., another user), by transferring the shares in the bundle order 20 to an account associated with the gift recipient (e.g., another user). In some embodiments, the exemplary inventive computer-based platform for purchasing and administering bundles of fractional digital assets may be programmed to allow the user to gift the bundle order 20 or a notional amount represented by the bundle order 20 to a gift recipient who does not have an account. For example, the recipient may be a minor that cannot yet legally have an investment account.

In some embodiments, the exemplary inventive computer-based platform for purchasing and administering bundles of fractional digital assets may be programmed to allow the user to fund the gift of the notional amount c with new funds added to the gifting user account, existing cash in the gifting user account and/or cash generated by selling existing positions in the gifting user account before the purchase of the bundle of fractional stock positions. In some embodiments, the exemplary inventive computer-based platform for purchasing and administering bundles of fractional digital assets may be programmed to allow the recipient of the gifted bundle user to accept the gifted bundle order 20. In some embodiments, the exemplary inventive computer-based platform for purchasing and administering bundles of fractional digital assets may be programmed to electronically transmit the resulting bundle order 20 to the order entry service 150 via the client channel 190 to initiate a purchase of the constituent stock positions in the bundle order 20.

In some embodiments, the exemplary inventive computer-based platform for purchasing and administering bundles of fractional digital assets may be programmed so that, at step 2, the exemplary order entry service 150 communicates with a risk validation component (e.g., credit and risk) 170 to check credit risk of the bundle order 20. For example, each asset in the bundle order 20 may be validated against a threshold risk level according to a particular set of rules, e.g., credit and risk standards. In some embodiments, the risk of each asset in the bundle order 20 is aggregated for to determine a bundle order 20 risk. Where the bundle order risk 20 is within the credit and risk standards, the bundle order 20 is approved. In some embodiments, the exemplary inventive computer-based platform for purchasing and administering bundles of fractional digital assets may be programmed to individually determine the risk of each asset in the bundle order 20 and approve or disapproved according to a particular set of rules (e.g., the credit and risk standards). In some embodiments, the exemplary inventive computer-based platform for purchasing and administering bundles of fractional digital assets may be programmed to automatically remove disapproved assets of the bundle order 20, and, then, notify the user via, e.g., the client channel 190. In some embodiments, the exemplary inventive computer-based platform for purchasing and administering bundles of fractional digital assets may be programmed so that, upon disapproval of one or more assets, the user may be presented with option(s) to, e.g., (1) add other assets to replace the disapproved assets, (2) remove the disapproved assets and change the notional amount, (3) remove the disapproved assets and maintain the notional amount for the bundle order 20 with the remaining approved assets, (4) cancel the bundle order 20, or (5) other suitable option.

In some embodiments, the exemplary inventive computer-based platform for purchasing and administering bundles of fractional digital assets may be programmed so that, at step 3, the order entry service 150 splits the bundle order 20 into a plurality of constituent individual client orders 22 based on the constituent stock positions of the bundle order 20.

In some embodiments, creating the client orders 22 from the bundle order 20 includes dividing the notional purchase amount, e.g., equally among the assets selected by the user for their bundle. In some embodiments, splitting the bundle order 20 into multiple the client orders 22 can include a minimum notional amount for each stock in the bundle (e.g., $100) and a maximum total notional amount for the entire bundle (e.g., $5,000). Because of the low notional purchase amounts and equal weighting among the constituent stocks, the bundle order 20 may include fractional shares of some or all of the constituent stocks, including less than a single share of a stock as applicable. For example, a bundle order 20 having the following five "High Tech" stocks purchased in a $1,000 notional amount would result in the following share amounts (approximately, based on past market prices): AMZN at 200 dollars for 0.34 shares, AAPL at 200 dollars for 0.53 shares, GOOGL at 200 dollars for 0.20 shares, MSFT at 200 dollars for 0.93 shares, and NVDA at 200 dollars for 1.03 shares.

In some embodiments, the exemplary inventive computer-based platform for purchasing and administering bundles of fractional digital assets may be programmed to execute the client orders 22 to provide the user with direct ownership of the fractional shares (positions) by, e.g., dynamically allocating fractions of shares in the client orders 22 to the user's account and to a firm account that may be associated with fractional positions of numerous other users. In some embodiments, the firm account may be associated with and/or be controlled by an administrator of the exemplary inventive computer-based platform for purchasing and administering bundles of fractional digital assets. In some embodiments, the exemplary inventive computer-based platform for purchasing and administering bundles of fractional digital assets may be programmed to purchase whole number shares corresponding to fractional positions of the client orders 22 and then utilize a separate database or memory for the firm account to generate an inventory of the items of the client orders 22, and then automatically assign each respective fractional interest. In some embodiments, by using the separate database and/or account, the exemplary inventive computer-based platform for purchasing and administering bundles of fractional digital assets may be programmed to administer the remaining interest in the whole unit number (e.g., the remaining interest in a share) (the inventory) for purposes of reuse, disbursement, purchase and sale, or other uses.

In some embodiments, the exemplary inventive computer-based platform for purchasing and administering bundles of fractional digital assets may be programmed, at step 4, to propagate an update associated with the client orders 22 across the platform. In some embodiments, for example, at step 4a, the exemplary inventive computer-based platform for purchasing and administering bundles of fractional digital assets may be programmed to that update a database 180 with the client orders 22. In some embodiments, the database 180 can include, e.g., one or more database storage devices and/or electronic locations configured to management and/or storage of accounts, transactions, asset inventory, among other data. In some embodiments, the exemplary inventive computer-based platform for purchasing and administering bundles of fractional digital assets may be programmed to log or otherwise record each transaction request associated with the client orders 22, by recording in the database 180, e.g., assets to be purchased, each portion of the total notional amount per asset, the resulting number of shares of each asset including fractional shares, the account of the user, among other pertinent information and combinations thereof. For example, the client orders 22 can be stored in the database 180 in, e.g., tabular form and linked to the user's account.

In some embodiments, the exemplary inventive computer-based platform for purchasing and administering bundles of fractional digital assets may be programmed to, at step 4b, update an event sourcing database 182 with the client orders 22. In some embodiments, the event sourcing database 182 can maintain record(s), such as, e.g., a temporary buffer in a storage device, of transactions in progress. For example, upon entry into the event sourcing database 182, the client orders 22 can be regularly or continually updated with new event(s) related to the client orders 22 to track changes in their state, e.g., modifications to the client orders 22, status changes, order fulfillment status, aggregation and allocation of data, and any other changes to form version control of the client orders 22 and record transactions related therewith.

In some embodiments, the event sourcing database 182 may maintain, e.g., a table of relationships for each client order 22. For example, the exemplary inventive computer-based platform for purchasing and administering bundles of fractional digital assets may be programmed to record details of the client orders 22 in the event sourcing database 182, including, e.g., an item/digital asset to be ordered, a purchase price, a quantity to be purchased, including a fractional quantity, one or more allocation links to accounts associated with the client order. In some embodiments, the table itself can be linked to accounts, or entries in the table can be linked to accounts, or both. In some embodiments, any changes or updates to the client order 22 are entered into the table, including, e.g., fulfillment status, order rejection, re-allocation to other accounts, transfers, purchases, among other changes and transactions pertaining to the client order 22.

In some embodiments, the exemplary inventive computer-based platform for purchasing and administering bundles of fractional digital assets may be programmed to at step 5, send the client orders 22 to an order aggregation service 100. The order entry service 150 sends the client orders 22 over a connection to the order aggregation service 100 via, e.g., an order execution API or one or more order execution engines/routers. Upon communication of the client orders 22, the order entry service 150 may close the connection to the order aggregation service 100. However, in some embodiments, the order entry service 150 may maintain a persistent connection with the order aggregation service 100.

In some embodiments, at step 6, the order aggregation service 100 may acquire market prices from a market data service 160 for each of the client orders 22. Thus, the order aggregation service 100 may communicate, e.g., via a wired or wireless communication network, with the market data service 160. The market data service 160 may interface with external information providers to determine a latest or real-time price of each available digital asset (e.g., stock). In some embodiments, the market data service 160 may maintain a log or database of available digital assets (e.g., stocks), updated in real-time, and provide the latest updates to the order aggregation service 100 upon request. In some embodiments, the market data service 160 may pull the latest prices from a source upon a request from the order aggregation service 100.

In some embodiments, still referring to FIG. 1, at step 7, the order aggregation service 100 determines a number of ownership interest units of each digital asset (e.g., shares of stock), including fractional ownership interest (e.g., fractional shares of stock), for each client order 22 and aggregates each of the client orders 22 by rounding up to the nearest whole number. In some embodiments, the order aggregation service 100 can create an aggregate order 21 for a firm account associated with each of the aggregated client orders 22.

In some embodiments, the client orders 22 may include orders for fractional data objects, such as, fractional digital assets including stocks, digitized assets, or other digital representation of various digital items/products, such as commodities, foodstuffs, bulk orders. However, such objects may only be available in whole number amounts, such as, e.g., whole number shares of stocks. In some embodiments, requesting a fraction of the object would be an invalid request to a fulfilling entity. To reconcile the request for a fractional object, as requested in the client orders 22, the order aggregation service 100 determines a next larger whole number amount of the object to order form the fulfilling entity. In some embodiments, to prevent purchasing more than the client order 22 on behalf of the user, the order aggregation service 100 determines a fractional allocation between multiple accounts of multiple users, such as, e.g., between account storage locations in one or more account databases such as database 180, including a central account, such as a firm account, and a user account associated with the client order 22.

In some embodiments, the order aggregation service 100 generates the aggregate order 21 that represents the next highest whole number of units/objects (e.g., the next highest whole number of shares) relative to the client order 22. The aggregate order 21 includes a data object that is formed in whole number amounts, and is added to the event sourcing database 182 in the table for the respective client order 22. The aggregate order 21 may specify a portion of the aggregate order 21 that is allocated to the firm account, and a portion that is allocated to the user account. In some embodiments, the aggregate order 21 may specify each allocation using, e.g., a joint table with linking data, such as metadata, that links portions of the data object to respective accounts in respective account database storage locations, a relational table that specifies the allocation for each account, among other data structures. The account database storage locations may be, e.g., separate databases, separate partitions of a database, separate locations within a distributed database, or other storage structure for maintaining multiple accounts. In some embodiments, the linking data may include, e.g., account identifiers, storage or database locators, or other types of linking data to link a portion of the aggregate order 21 to a respective account.

For example, in some embodiments, where the user's bundle order 20 results in fractional ownership interest units (e.g., fractional shares of stock), the exemplary inventive computer-based platform for purchasing and administering bundles of fractional digital assets may be programmed to aggregate the client orders 22, including rounding to the next greater number of whole ownership interest units (e.g., fractional shares of stock). In some embodiments, the order aggregation service 100 may aggregate the client orders 22 of multiple bundle orders 20 across multiple clients and place a single order per unique digital asset (e.g., stock) on the market. In other embodiments, the client orders 22 of multiple clients are separately aggregated. For example, for each digital asset (e.g., stick) on the client order 22, the exemplary inventive computer-based platform for purchasing and administering bundles of fractional digital assets may be programmed to generate a new aggregated order 21 on the internal firm account, rounded up to the nearest share (based on a current market price) and send the aggregated order 21 to the market on behalf of the user. Then, the exemplary inventive computer-based platform for purchasing and administering bundles of fractional digital assets may be programmed to determine, via the order aggregation service 100, the fractional portion of the share(s) that is to be allocated to the user, where the difference between the fractional share and the next nearest whole share can be allocated to the firm account or to an account of another user.

In some embodiments, each client order 22 can be linked to the aggregate order 21 such that, e.g., the applicable fractional shares of the aggregate order 21 can be allocated to the respective user's account. In some embodiments, any remaining fractional shares of the aggregate order 21 not allocated to the user can be linked for allocation to the firm account. In some embodiments, client orders 22 are not aggregated across multiple users, and shares (fractional or whole) held in the firm account are not used to fill subsequent purchaser's orders.

For example, a client order 22 for $100 on a stock priced at $200 results in a fractional share. The order aggregation service 100 facilitates the exemplary inventive platform to purchase full shares on the internal firm account. The user's proportional share allocation, in this example, ½ a share, can then be identified by the exemplary inventive computer-based platform by linking data between the purchased share and the client order 22.

In some embodiments, the client orders 22 are be treated as separate, individual orders, as opposed to, for example, a single order of a $1,000 "Banks" bundle. This treatment is for purposes of both facilitating trading operations processes and the display to the user in a user interface, from order entry to order status to settlement. In some embodiments, the exemplary inventive computer-based platform for purchasing and administering bundles of fractional digital assets may be programmed to generate to the user separate individual trade confirmations for each digital asset purchase (e.g., each stock buy) and show the trade as a riskless principal trade. In some embodiments, the exemplary inventive computer-based platform for purchasing and administering bundles of fractional digital assets may be programmed to collect no commission on bundle orders 20. The user may sell a single stock from the bundle order 20; they are not limited to selling all stocks in the bundle order 20 at the same time. In some embodiments, even though the bundle orders 20 and client orders 22 are with respect to notional purchase amounts, sell orders may be in shares, not notional dollar amounts because the user directly owns the assets of the bundle order 20. In some embodiments, if the user has a position (e.g., ownership interest unit(s)) in a stock of the bundle order 20 that is greater than a whole share, the user may sell the entire position (all whole shares and any fraction), a number of whole shares, or a number of whole shares plus the fractional share. In some embodiments, a user's ownership in the assets of the bundle order 20 upon execution could allow for selling shares that results in a remainder of less than a whole share in the user's account. In some embodiments, the exemplary inventive computer-based platform for purchasing and administering bundles of fractional digital assets may be programmed to restrict the user, via the order aggregation service 100, from leaving less than one whole share in their account.

In some embodiments, the aggregation is only performed after market-close to create a single order per unique stock of the client orders 22 of the multiple clients. The orders can then be sent upon market open. In some embodiments, client orders 22 received during market hours are aggregated and sent to the market in substantially real-time.

In some embodiments, at step 8, the exemplary inventive computer-based platform for purchasing and administering bundles of fractional digital assets may be programmed to update event sourcing database 182 with the information/allocation pointer, linking the aggregate order 21 and client order 22. In some embodiments, to facilitate tracking allocations and verifiable ownership of the allocations, the order aggregation service 100 updates the record of the client orders 22 in the event sourcing database 182 with the respective aggregate order 21. Thus, the aggregate order 21 is represented in the event sourcing database 182 as a modification to the client order 22, including the linking data establishing an allocation of the aggregate order 21 corresponding to the client order 22, and another allocation of the aggregate order 21 corresponding to a remainder of the aggregate order 21. Thus, In some embodiments, the event sourcing database 182 records to the aggregate order 21 as part of the chain of transactions of the bundle order 20 and respective client order 22. For example, the aggregate order 21 can be added to the table for the corresponding client order 22, with the relational and/or linking data that specifies the allocations to each respective account. Thus, ownership of a portion of the aggregate order 21 can be verifiably recorded so that the user can directly own a fraction of an item (digital asset), even where an external fulfillment service or venue only fulfills whole number orders.

In some embodiments, at step 9, the exemplary inventive computer-based platform for purchasing and administering bundles of fractional digital assets may be programmed to send the aggregate order 21 to the order entry service 150. The order aggregation service 100 can include, e.g., an order execution API, similar to or the same API that can be employed by the order entry service 150 as described above. In some embodiments, the order aggregation service 100 may communicate each aggregate order 21 to the order entry service 150 via an API such as a representational state transfer (REST) application programming interface (API) 32. Accordingly, the order entry service 150 may determine the client orders 22 from the bundle order 20, or receive from the order aggregation service 100 an aggregate order 21 for each of the client orders 22.

In some embodiments, at step 10, the exemplary inventive computer-based platform for purchasing and administering bundles of fractional digital assets may be programmed to send each aggregate order 21 to an order routing service 140. To facilitate processing an order, e.g., on a stock marketplace (e.g., stock exchange), the order entry service 150 may send each aggregate order 21 immediately to the order routing service 140 by a high-performance API, such as an API utilizing a transport layer for low-level features and fast performance, such as, e.g., an Ultra Performance API (UPA or Ultra).

In some embodiments, at step 11, the exemplary inventive computer-based platform for purchasing and administering bundles of fractional digital assets may be programmed to route the aggregate orders 21 with the order routing service 140. The order routing service 140 may, e.g., identify an appropriate fix gateway 130 for each aggregate order 21 based on, e.g., market networks corresponding to the market holding the respective asset of each aggregate order 21.

In some embodiments, still referring to FIG. 1, at step 12, the exemplary inventive computer-based platform for purchasing and administering bundles of fractional digital assets may be programmed to communicate the aggregate order 21 to at least one external venue 192 using a selected fix gateway 130.

In some embodiments, at step 13, the exemplary inventive computer-based platform for purchasing and administering bundles of fractional digital assets may be programmed to receive, via the fix gateway 130, a filled aggregate order 23 from the respective external venue 192. In some embodiments, the external venue 192 processes the aggregate order 21 to, e.g., purchase the respective shares of each respective stock associated with aggregate order 21. In some embodiments, the external venue 192 may then return the filled aggregate order 23, including, e.g., digitized items such as digitized assets associated with the aggregate order 21. In some embodiments, upon fulfillment, the exemplary inventive computer-based platform for purchasing and administering bundles of fractional digital assets may be programmed to modify the aggregate order 21 by a change to, e.g., metadata specifying a transaction receipt, including, e.g., a link to the digitized items, number of items (e.g., ownership units of digital asset(s)) purchased, price per item, and allocations, among other related data to the fulfilled aggregate order 21.

In some embodiments, at step 14, the exemplary inventive computer-based platform for purchasing and administering bundles of fractional digital assets may be programmed to transfer the filled aggregate order 23 from the fix gateway 130 to an order posting service 120.

In some embodiments, at step 15, the exemplary inventive computer-based platform for purchasing and administering bundles of fractional digital assets may be programmed to update the database 180 by the order posting service 120 with information related to the filled aggregate order 23. As a result, in some embodiments, a notice of the aggregate order 21 having been filled, along with transaction details associated with filling the aggregate order 21, may be stored in the database 180, such as in the linked account storage locations specified in the event source database 182. For example, where the aggregate order 21 contains allocations to a user account, the order posting service 120 may post the aggregate order 21 transaction to the user's account in, e.g., the database 180. Similarly, the database 180 may maintain a record of all transactions on the exemplary inventive platform for, e.g., fraud control, security, data mining, among other purposes. In some embodiments, the order posting service 120 may be configured to post the entirety of the filled aggregate orders 23 to the firm account stored in the database 180. In some embodiments, prior to allocation to a user's account, execution of the aggregate orders 21 are completed by executing the aggregate orders 21 with respect to the firm account, while the exemplary inventive computer-based platform for purchasing and administering bundles of fractional digital assets may be programmed to maintain the linking data for later allocation out of the firm account into a user's account.

In some embodiments, at step 16, the exemplary inventive computer-based platform for purchasing and administering bundles of fractional digital assets may be programmed to analyze the aggregate order 21 and determine the appropriate allocations using the order posting service 120. In some embodiments, the order posting service 120 analyzes the filled aggregate orders 23, including, e.g., checking the linking data included with the aggregate orders 21. The order posting service 120 may then generate a set of instructions to perform an allocation based on the analysis of the filled aggregate orders 23.

In some embodiments, at step 17, the exemplary inventive computer-based platform for purchasing and administering bundles of fractional digital assets may be programmed to receive the filled aggregate orders 23 and the instructions by an internal execution service 110 from the order posting service 120. The internal execution service 110 implements the instructions from the order posting service 120 by, e.g., loading the instructions in a memory for execution by a processor. In some embodiments, the internal execution service 110 may implement the instructions to execute the aggregate order 21 by updating the event sourcing database 182. As such, each respective client order 22 in the event sourcing database 182 is appended with the aggregate order 21 execution information including verification of fulfillment of the aggregate order 21 and the linking data for determining allocations. In some embodiments, the client orders 22 are each updated and verifiable in the event sourcing database 182.

In some embodiments, at step 18, the exemplary inventive computer-based platform for purchasing and administering bundles of fractional digital assets may be programmed to calculate the allocation quantity based at least in part on the execution price and the instructions from the order posting service 120 to allocate the client order 22 quantity from the firm account into the client account. For example, upon execution of each order in the firm account and posting by the order posting service 120, the internal execution service 110 allocates the proportional fractional portion of a digital asset (e.g., a fractional share amount totaling the intended notional amount on the client order 22) to the user's account based on the linking data from the aggregate order 21 to the corresponding client order 22. In some embodiments, upon allocating the client order 22, the notional order is closed.

In some embodiments, at step 19, the exemplary inventive computer-based platform for purchasing and administering bundles of fractional digital assets may be programmed to post, via the internal execution service 110, the client order 22 allocation to the order posting service 120 based on the aggregate order 21 and linking data, as described above. In some embodiments, the order posting service 120 may, in turn, post the allocation to update the database 180. For example, the order posting service 120 can transmit the client orders 22 to the database 180 to cause the database to transfer the user's allocation of the aggregate order 21 to a user's account. In some embodiments, each stock in the bundle order 20 may be shown on the client's account as a separate order for the proportional notional amount, therefore, all order status may be provided at that granular level.

In some embodiments, after execution is complete, users may purchase more digital assets (e.g., stock(s)), or liquidate their assets individually. In some embodiments, reference to the original bundle order 20 that seeded the account may no longer be available or used for any other purpose or reference. In some embodiments, the bundle digital assets (e.g., stocks) may be shown in the user's brokerage account (e.g., via online access and account statements) as separate, individual positions. In some embodiments, no supplemental or "below the line" reporting will be provided at the bundle level. In some embodiments, fractional share positions can be eligible for margin and the user may receive dividends on fractional share positions. However, in some embodiments, only whole shares will allow the investor to exercise voting rights.

Figure 2:
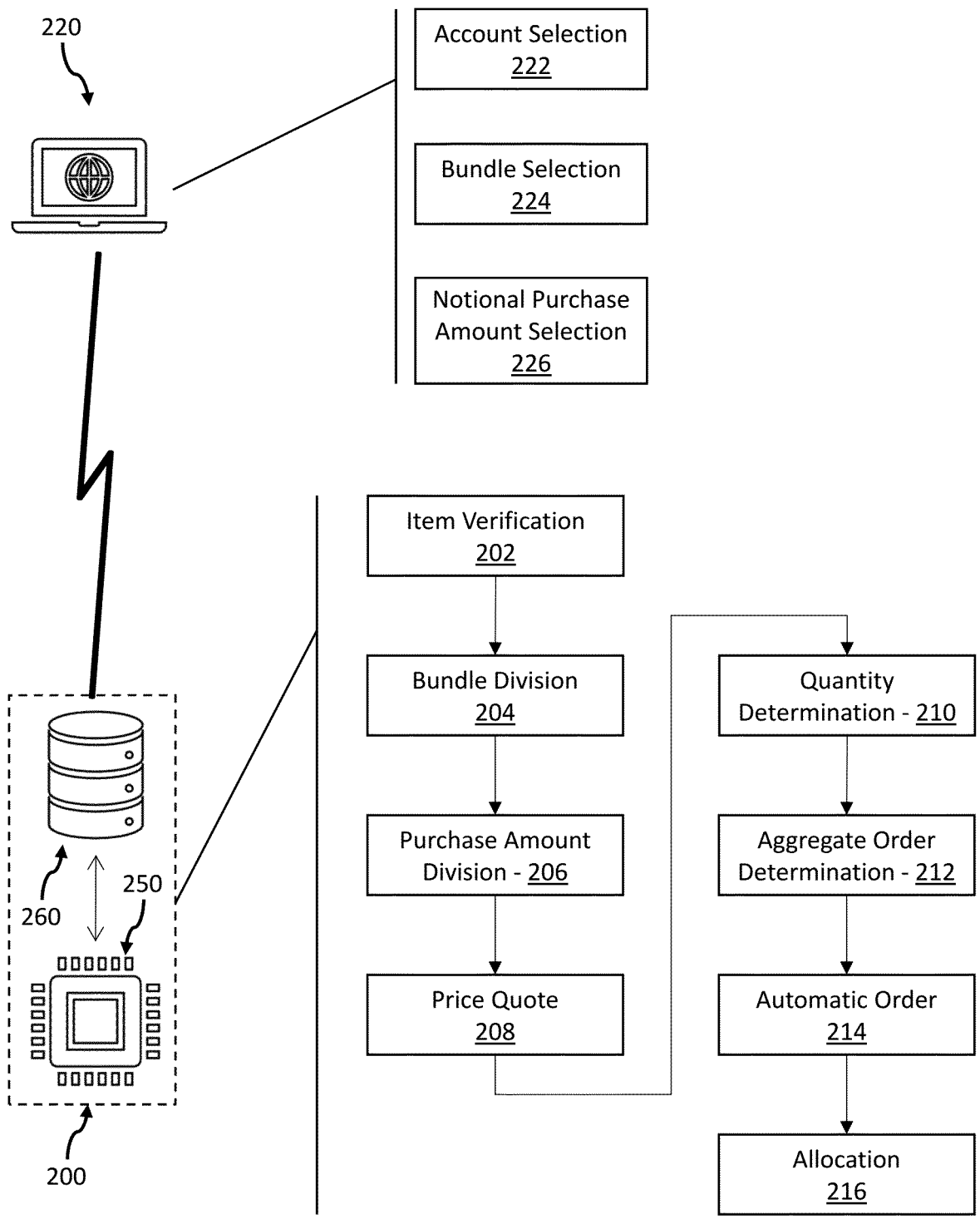

FIG. 2 illustrates a flowchart of an exemplary inventive methodology for purchasing and allocating fractional ownership interest units of digital assets in bundles (e.g., fractional shares of stocks) on a digital assets bundle ordering platform in accordance with one or more embodiments of the present disclosure.

According to an embodiment of the present invention, a user may place a bundled order of assets (e.g., stocks) via a user device 220. The user device 220 may include, e.g., a member device 602-604 as described below with reference to FIG. 6, or client device 702a-n as described below with reference to FIG. 7. As such, embodiments of the present invention contemplate a user device 220 including, e.g., any suitable device for accessing the exemplary inventive computer-based platform for purchasing and administering bundles of fractional digital assets 200, such as, e.g., a laptop computer, a desktop computer, a mobile device include a smartphone or a tablet via an input device including a keyboard, touchscreen, mouse, or other input device, or over a telephone line via a telephone voice order system, or any device for accessing a web application or website for order bundle orders.

Upon accessing the exemplary inventive computer-based platform for purchasing and administering bundles of fractional digital assets 200, the user may perform an account selection 222. The account selection 222 can include, e.g., creating or accessing a user account. For example, the account selection 222 may include inputting a username and/or password to access a secured account associated with the bundle ordering platform 200.

Upon account selection 222, the user may, according to an embodiment, perform a bundle selection 224. The exemplary inventive computer-based platform for purchasing and administering bundles of fractional digital assets_200 may provide to the user, via the user device 220, a list, table, or other representation of a selection of item bundles. The item bundles can be organized by, e.g., category of the time, type of item, theme, price, or other characteristic. In some embodiments, the exemplary inventive computer-based platform for purchasing and administering bundles of fractional digital assets 200 may provide the user with a selection of predefined bundles according to, e.g., theme or category. For example, the exemplary inventive computer-based platform for purchasing and administering bundles of fractional digital assets 200 may provide predetermined bundles of stocks including, e.g., technology sector stocks with a small (e.g., 3 to 10, 5 to 15, 5 to 25, etc.) selection of publicly traded companies in the technology sector. In some embodiments, the exemplary inventive computer-based platform for purchasing and administering bundles of fractional digital assets 200 may provide the option to select bundles by selecting individual items, or by modifying the predetermined bundles with individual items. The user may then browse the selection of item and item bundles and create, via the input device of the user device 220, the bundle selection 224.

In some embodiments, the exemplary inventive computer-based platform for purchasing and administering bundles of fractional digital assets 200 may provide the user, via the user device 220, an option to perform a notional purchase amount selection 226. Rather than selecting a number of each item in the bundle selection 224, the user may select a desired notional amount to pay for the bundle selection 224 on the whole. Thus, the exemplary inventive computer-based platform for purchasing and administering bundles of fractional digital assets 200 may provide a selection of notional amounts ranging from, e.g., 100 U.S. dollars to 5000 U.S. dollars. In some embodiments, the exemplary inventive computer-based platform for purchasing and administering bundles of fractional digital assets 200 may provide a tool for inputting a desired notional amount, e.g., in whole dollar amounts with a maximum (e.g., 5000 dollars) and a minimum (e.g., 200 dollars). Thus, the user may easily select an amount of money to spend independent of the items being ordered. The user may then select the desired notional purchase amount selection 226.

In some embodiments, the user 220 may communicate each of the account selection 222, the bundle selection 224 and the notional purchase amount selection 226 to the platform 200 using, e.g., a communication device such as a transceiver for, e.g., wired or wireless communication of data. In some embodiments, the platform 200 may include a database 260 for maintaining and storing data, and one or more processors 250 for analyzing, generating and receiving data. For example, the platform 200 may include network servers such as, e.g., network servers 606 and 607 as described with reference to FIG. 6 below, server devices 704 and/or 713 along with network databases 707 and/or 715 as described below with reference to FIG. 7, and/or a cloud platform such as the cloud platform described above with reference to FIGS. 8 and 9. In some embodiments, the database 260 includes a database for account management and storage such as the database 180 described above with reference to FIG. 1 and/or an event sourcing database 182 as described above with reference to FIG. 1. Accordingly, the platform 200 may receive the account selection 222, the bundle selection 224 and the notional purchase amount selection 226 (collectively, the "bundle order"), and record the bundle order in an account storage in the database 260 associated with the account selection 222.

In some embodiments, still referring to FIG. 2, the processor 250 analyzes the account selection 222, bundle selection 224 and notional purchase amount selection 226 (collectively, the bundle order). Using the processor 250 and the database 260, the platform 200 performs and item verification 202 to verify the items of the bundle selection 224. The item verification 202 may include, e.g., checking inventory, assessing security, assessing risk such as financial risk, among other verification tasks.

Upon verification of the items of the bundle selection 224, the b platform 200 performs a bundle division 204 by dividing the bundle selection 224 into the constituent items of the selected bundle. By dividing the bundle selection 224, the platform 200 may generate separate individual items pertaining to each of the items in the bundle selection 224.

In some embodiments, using the individual items, the platform 200 may then determine an amount of each of the items to order. Because the bundle order includes a notional purchase amount selection 226, the user may determine a budget for the bundle order without concern for which items the user orders, thus increasing the ease of making an affordable order. However, in some embodiments, because the user has made a notional purchase amount selection 226 for the whole of the bundle selection 224, an amount of each individual item in the bundle selection 224 has been left undetermined.

In some embodiments, the platform 200 may automatically generate an order quantity for each individual item separated from the bundle selection 224 by, e.g., performing notional purchase amount division 206. The platform 200 may be programmed to automatically divide, via the notional purchase amount division 206 module/administrator, the notional purchase amount selection 226 across each of the individual items separated from the bundle selection 224. For example, in some embodiments, the notional purchase amount division 206 is programed to divide the notional purchase amount selection 226 evenly across all individual items of the bundle selection 224. Thus, the individual items can be modified to append a purchase amount based on the notional purchase amount selection 206 to each respective individual item to generate item orders associated with each individual item. The item orders may then be updated and stored in the database 260, e.g., in an account storage associated with the user.

In some embodiments, the platform 200 may determine a price of each individual item of the item orders by performing a price quote 208. The price quote 208 can include, e.g., referencing a database, such as an external item database with costs associated to each of the individual items. For example, where the items/digital assets are stock shares, the price quote 208 may include referencing each stock of an order with a market database to determine the price for that stock. However, the stock price may also determine any other similarly suitable discovery mechanisms. Thus, the price quote 208 determines the latest price of each individual item.

In some embodiments, upon performing the price quote 208, the platform 200 may perform a quantity determination 210 to determine a quantity of each individual item to order based on the item orders and the price quote 208. Thus, the platform 200 may associate each price in the price quote 208 with the corresponding individual item. Based on the price and the purchase amount determined by the notional purchase amount division 206, the quantity determination 210 determines a fractional quantity of each individual item to be allocated to the user's account.

In some embodiments, the items may not be sold in fractional quantities. For example, financial digital assets (such as stocks), property, and other assets, as well as foodstuffs, consumables, digital files (such as media), among other items may be sold in whole number quantities only, but may be beneficially shared in fractional quantities (e.g., fractions of ownership interest units) upon purchase. In some embodiments, instead of executing the order for the whole number quantity of each asset (e.g., stock) in the bundle in real-time as previously described, the platform 200 is configured to purchase the whole number quantity by determining an aggregate quantity among many users through an aggregate order determination 212. The aggregate order determination 212 may include analyzing each individual item and associated fractional quantity requested by one or more users, and rounding the fractional quantities to the next greater whole number quantity to produce an aggregate quantity for each individual item. In some embodiments, the platform 200 may use the aggregate quantity and the associated individual items to produce an aggregate order through the aggregate order determination 212. The aggregate order can be appended to the record of the item orders along with the fractional quantity and purchase price to generate a record in, e.g., the database 260 of the aggregate order associate with each item order of a bundle selection 224.

In some embodiments, the platform 200 performs an automatic order 214 by ordering each item of the aggregate order according to the aggregate quantity. The automatic order 214 can include, e.g., interfacing with an external marketplace or external organization to purchase the items of the aggregate order. Upon fulfillment of the automatic order 214, the platform 200 may update the database 260 by appending a fulfillment status for each aggregate order in the record of each respective item order of the bundle selection 224. In some embodiments, a proof of purchase or digitization of the item may be stored in an account storage location of the database 260 associated with a firm account of the bundle ordering platform 200. Thus, the bundle ordering platform 200 aggregates all purchased items in the firm account, with each purchased item including an indication of the associated item order in the record of the database 260.

In some embodiments, the platform 200 may then perform an allocation 216 by accessing the record for each item order and determining the correct allocation of each of the purchased items. Thus, the platform 200 may, in some embodiments, access the purchased item and extract the indication of the associated item order. Upon extracting the indication of the associated item order, the platform 200 may determine the allocation to the user according to the item order based on a difference between the aggregate quantity and the fractional quantity of each individual item associated with each purchased item.

In some embodiments, the purchased item is divisible. In such a case, according to the allocation, the platform 200 divides the purchased item according to the fractional quantity allocated to the user and communicates the fractional quantity to the user. For example, where the bundle selection 224 is for a selection of foodstuffs, the platform 200 may determine a portion of the foodstuffs allocated to the user and provide to the user proof of purchase or digitization from the firm account to the user account in the database 260. However, in some embodiments, the purchased item is not divisible. In such a case, the platform 200 generates an allocation record. The allocation record may represent a digital representation of an ownership interest in the nondivisible purchased item. For example, where the bundle selection 224 includes stock shares, the stock shares are not divisible. Thus, the platform 200 may maintain the purchased stock shares in the firm account and, using the record in the database 260 associated with the bundle selection 224, generate the allocation linking record including a document assigning an ownership interest in the allocated portions of the stock shares to the user. The record may then be updated with the allocation record such that the value of the fractional quantity of the stock share ordered by the user is attributed to the user account. Thus, the bundle ordering platform 200 can provide users with direct ownership of items, such as financial assets, in fractional quantities upon ordering of bundled items.

Figure 3:
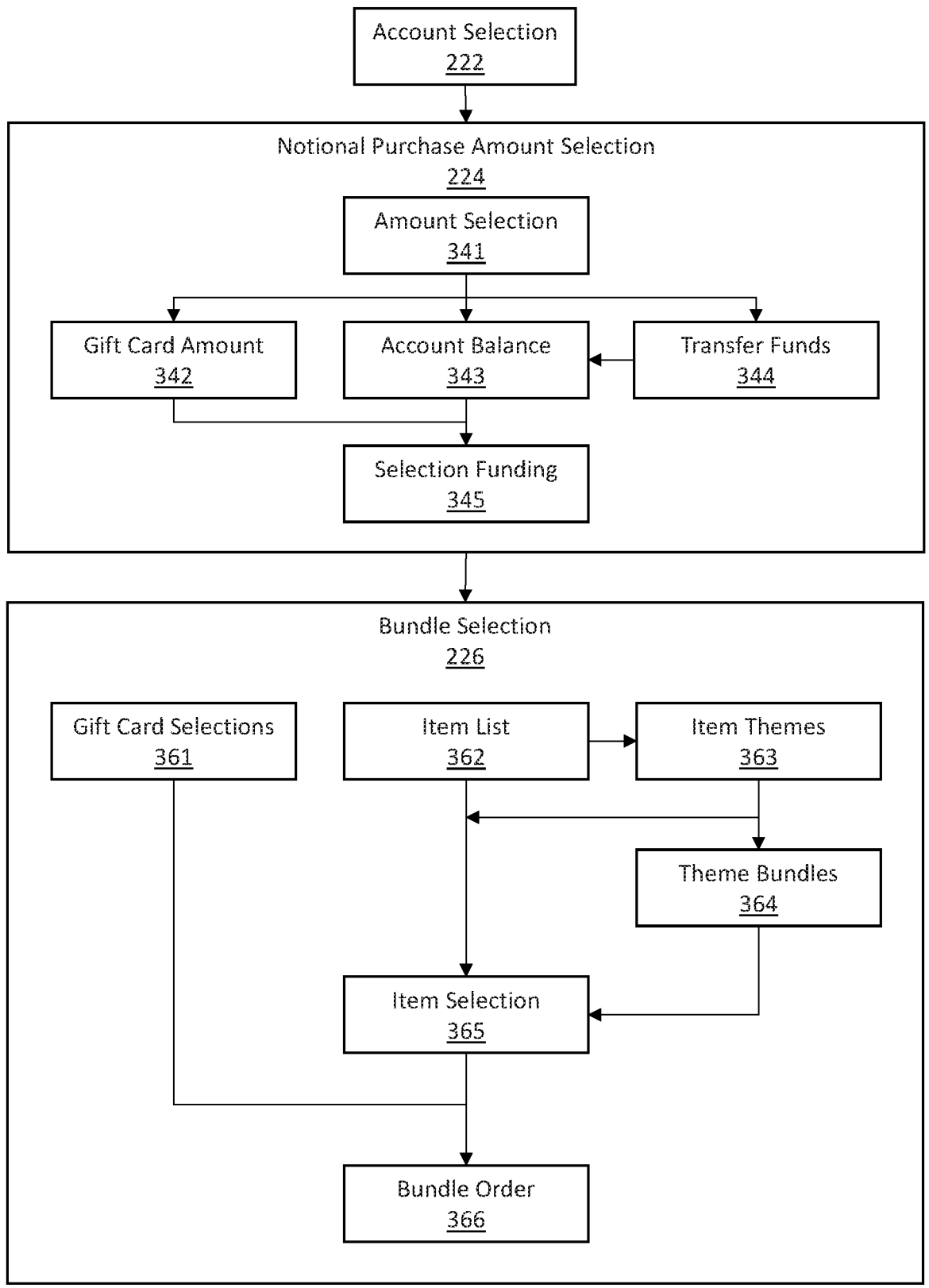

FIG. 3 illustrates a flowchart of an exemplary inventive methodology for constructing digital assets (e.g., stocks) bundles using a digital assets bundle ordering platform in accordance with one or more embodiments of the present disclosure.

In some embodiments, a bundle order 320 may be generated at a user device based on user selections. In some embodiments, selections may include gifted items or gifted notional amounts with, e.g., a gift card. Upon making an account selection 322, a user can make a notional purchase selection 324 and a bundle selection 224 to produce an order for a bundle of items (e.g., shares of stocks) to be purchased for a notional amount.

In some embodiments, upon making an account selection 322 with which to associate a bundle order 320, the exemplary inventive computer-based platform for purchasing and administering bundles of fractional digital assets may be programmed to allow the user to access to account funds for transfers, deposits and withdrawals. Using the account funds, a notional purchase amount selection 226 may be made. The notional purchase amount selection 226 may include an amount selection. In some embodiments, the user may select from a selection of notional purchase amount options, such as, e.g., 100 dollars, 200 dollars, 500 dollars, 1000 dollars, and/or 5000 dollars, among additional or different notional purchase among options. In other embodiments, the user may be free to enter any notional purchase amount within a range of, e.g., between about 100 dollars and about 5000 dollars. The amount selection 324 may be funded with a selection funding 345 determination that may include determining sources of funding, such as, a gift card amount 342, an account balance 343 and/or a transfer of funds 344. In some embodiments, the account selection 322 includes an account with an associated gift card for a notional purchase amount for purchasing items in a bundle. In another embodiment, the associated gift card provides a quantity of liquid funds for use as a notional purchase amount, or for an addition to account funds.

In some embodiments, upon making a notional purchase amount selection 226, the user may make a bundle selection 224. The bundle selections 326 may include forming a bundle order 366 from selectable items available for bundling. For example, the selectable items may include an item list 362, organizable by item theme(s) 363. In some embodiments, the selectable items may be a gift card selection 361 of items dictated by a gift card selected by the gift card amount 342 during notional purchase amount selection 226.

Illustrative Examples of Bundle Ordering with Account Funds including a Gift Card In some embodiments, upon selecting a desired amount selection 341, the user has an option to fund amount selection 341 based on a selection of some or all of a gift card amount 342 and some or all of the account balance 343.

In some embodiments, the gift card amount 342 is determined. A gift card may be entered, e.g., by entering a serial number or account number of the gift card. By entering the gift card, funds purchased by a gifter may be transferred into the account selection 322. Alternatively, the gift card may be linked to the account selection 322 digitally. For example, the user may see a depiction of a gift card available for selection as a funding source for the notional purchase amount selection 226.

The gift card may have a predetermined quantity of money associated therewith. Upon selecting the gift card, either by entering, e.g., the gift card account number, or selecting the gift card, the gift card amount 342 may be determined as the predetermined quantity of money. The gift card amount 342 may be made available as a form of account funds for use in purchasing bundles of items.

Additionally, the account selection 322 may include an account that has preexisting funds in the account balance 343 associated therewith by, e.g., prior fund transfers, returns from asset sales, such as stock sales, or other source of income to the account selection 322. As a result, the account selection 322 may include a preexisting account balance 343 saved therein which may be made available as account funds for the purchase of bundles.

Similarly, the account balance 343 may modified with a transfer of funds 344 to the account from, e.g., another account, a bank account, a credit account, an item sale such as an asset sale, or other form of fund transfer. The transfer funds 344 may be added to the account balance 343 and made available along with the preexisting balance as account funds for bundle purchases.

In some embodiments, the selection funding 345 may be determined by selecting from funds available via the account balance 343 and/or the gift card amount 342. By selecting the funding sources for satisfying the amount selection 341, a notional purchase amount selection 226 is made.

In some embodiments, upon the notional purchase amount selection 226, including selection funding 345, bundle selection 224 may be performed. The user may be presented with an item list 362 of items for sale, such as, e.g., such as, but not limited to the MSCI ESG (environmental, social and governance) Indexes™ or a similar third-party classification system that allows for themes that are more specific (e.g., "Green Energy") or more broad (e.g., "Made in America") than the GICS™ classifications can support. For example, there could be a "Banks" theme and an "Other Financials" theme, the latter consisting of the stocks in the universe that are in the GICS Financials™ sector but not in the Banks sub-industry category. Upon selection of a theme, the user may, e.g., checking a box next to each desired item within the item theme 363 to make an item selection 365 from the item themes 363.

In some embodiments, the item themes 363 may include selections for preconstructed theme bundles 364. The theme bundles 364 may include bundles of popular, high performing, and/or high potential items. For example, a theme bundle 364 could include the following five "High Tech" (AMZN), Apple (AAPL), Google (GOOGL), Microsoft (MSFT), and Nvidia (NVDA). The theme bundles 364 can be expert curated or automatically generated for ease of use. By, e.g., checking a box next to each desired theme bundle 364, the user may make an item selection 365 from the item themes 363.

In some embodiments, the user may make an item selection 365 using a combination of the item list 362, item themes 363 and theme bundles 364. For example, the user may select a bundle from the theme bundles 364 and add or subtract items using the item list 362 and/or item themes 363. In some embodiments, the user may select items from one theme of the item themes 363 and then select different items from the item list 362 and/or different themes of the item themes 363.

Additionally, in some embodiments, where user selected a gift card for selection funding 345, the gift card may include gift card selections 361 with a selection of items for ordering. For example, the gift card selections 361 can include a predetermined bundle from, e.g., the gifter of the gift card to facilitate inexperience purchases selecting items. However, the gift card selections 361 may be augmented by the item selection 365 to form a bundle order 366 that includes a selection of multiple items to purchase with the notional purchase amount selection 226.

Illustrative Examples of Bundle Order Generation by Using a Gift Card

In some embodiments, upon selecting a desired amount selection 341, the user has an option to fund amount selection 341 based on a selection of a gift card amount 342 and an account balance 343.

In some embodiments, the gift card amount 342 is determined. A gift card may be entered, e.g., by entering a serial number or account number of the gift card. By entering the gift card, funds purchased by a gifter may be transferred into the account selection 322. Alternatively, the gift card may be linked to the account selection 322 digitally. Thus, the user may see a depiction of a gift card available for selection as a funding source for the notional purchase amount selection 226.

In some embodiments, the gift card may have a predetermined quantity of money associated therewith. In some embodiments, the quantity of money is restricted to the use of funding a notional purchase amount selection 226 for ordering a bundle of items. Upon selecting the gift card, either by entering, e.g., the gift card account number, or selecting the gift card, the gift card amount 302 may be selected as a sole source of selection funding 345 for funding the amount selection 341. Accordingly, selection of the gift card amount 342 for funding may automatically determine the amount selection 341 based on the quantity of the gift card amount 342.

Additionally, in some embodiments, where user selected the gift card for selection funding 345, the gift card includes gift card selections 361 with a selection of items for ordering. For example, the gift card selections 361 may include a predetermined bundle from, e.g., the gifter of the gift card to facilitate inexperience purchases selecting items. In some embodiments, the gift card may have one or more encoded indicia that would be scanned or acquired by the user utilizing the computing device having a suitable capability (e.g., scanning capability, image capturing capability, NFC-type capability). Upon acquiring the encoded indicia, the exemplary inventive computer-based platform for purchasing and administering bundles of fractional digital assets may utilize data encoded in the encoded indicia (e.g., encoded gift card-specific link or identifier/code) to automatically pre-populate (the gift card selections 361) a bundle order 366 to purchase with the notional purchase amount selection 226 formed by the gift card amount 342. Thus, in some embodiments, the gift card automatically determines the notional purchase amount selection 226 and the bundle selection 224 by importing from information linked to the gift card a purchase amount and an item selection for purchasing with the purchase amount.

However, the user may choose to fund the amount selection 341 via a preexisting account balance 343 rather than the gift card amount 342. The account selection 322 may include an account that has preexisting funds in the account balance 343 associated therewith by, e.g., prior fund transfers, returns from asset sales, or other source of income to the account selection 322. As a result, the account selection 322 may include a preexisting account balance 343 saved therein which may be made available as account funds for the purchase of bundles.

The account balance 343 may modified with a transfer of funds 344 to the account from, e.g., another account, a bank account, a credit account, an item sale such as an asset sale, or other form of fund transfer. The transfer funds 344 may be added to the account balance 343 and made available along with the preexisting balance as account funds for bundle purchases. The account balance 343 may then be selected for selection funding 345 according to the amount selection 341. Thus, the user may save the gift card amount 342 for another bundle purchase.

In some embodiments, upon the notional purchase amount selection 226, including selection funding 345, bundle selection 224 may be performed. The user may be presented with an item list 362 of items for sale, such as, available from a selection of companies. Each item in the item list 362 may be selectable for purchase. Thus, the user may browse the list and select each desired item within a minimum and maximum number of items for a bundle order, such as, e.g., between about 3 and about 10 items. By, e.g., checking a box next to each desired item, the user may make an item selection 365 from the item list 362.

FIG. 4 illustrates a user interface of an exemplary inventive methodology for purchasing and allocating stock bundle orders using a digital assets bundle ordering platform in accordance with one or more embodiments of the present disclosure. In an embodiment, the user interface includes a guided process for forming a stock bundle with a first "Select Stocks" step of selecting a bundle of stocks. The user interface may include, e.g., a list of themes to filter stocks, e.g., on a left panel of the user interface. Additionally, the user interface may include a list of stocks according to the selected theme in a center or right panel of the user interface. Using an input device, a user may select each desired stock by selecting a check box next to a name associated with the stock. For example, where the theme of "View All Available" is selected from the themes, all stocks from all themes are shown in the list of stocks. The list of stocks may be scrollable and/or paginated. Moreover, in embodiments, each stock in the list of stocks is presented with the stock market symbol in line with the name of the stock and a most recent price.

FIG. 5A illustrates a user interface of an exemplary inventive methodology for purchasing and allocating stock bundle orders using a digital assets bundle ordering platform in accordance with one or more embodiments of the present disclosure. In an embodiment, the user interface includes a guided process for forming a stock bundle with a first "Select Stocks" step of selecting a bundle of stocks. The user interface may include, e.g., a list of themes to filter stocks, e.g., on a left panel of the user interface. Additionally, the user interface may include a list of stocks according to the selected theme in a center or right panel of the user interface. Using an input device, a user may select each desired stock by selecting a check box next to a name associated with the stock. For example, where the theme of "Auto & Airlines" is selected from the themes, all stocks classified, e.g., according to the MSCI Global Industry Classification Standard (GICS)™ industries and sub-industries, or other suitable classification, as companies in the automotive sector or the airline sector are shown in the list of stocks. For example, the user may then selection check boxes next to, e.g., TSLA at $289.18 per share, LUV at $52.41 per share and DAL at $52.18 per share. The list of selections may be shown in a panel at the top for ease of use. The list of stocks may be scrollable and/or paginated. Moreover, in embodiments, each stock in the list of stocks is presented with the stock market symbol in line with the name of the stock and a most recent price.

Figure 5B:

FIG. 5B illustrates a user interface of an exemplary inventive methodology for purchasing and allocating stock bundle orders using a digital assets bundle ordering platform in accordance with one or more embodiments of the present disclosure. In an embodiment, by continuing from the "Select Stocks" interface, a user may be presented with a "Choose Amount" interface where the user may enter a desired notional purchase amount. The notional purchase amount may be, e.g., entered via a text box, for $500 dollars for example. In embodiments, the user may enter any notional purchase amount within, e.g., a limit of between about $100 and about $5000 dollars, or within another suitable range. Alternatively, in embodiments, the interface may present the user with a selection of notional amounts. Additionally, in embodiments, the user may select an option to give the order as a gift to, e.g., a minor for which the user has a custodial account.

FIG. 5C illustrates a user interface of an exemplary inventive methodology for purchasing and allocating stock bundle orders using a digital assets bundle ordering platform in accordance with one or more embodiments of the present disclosure. Upon selecting continue from the "Choose Amount" interface, the user may be presented with a determination of allocations of the notional purchase amount across the selected stocks. In some embodiments, the allocations may be spread evenly across each of the selected stocks. For example, where the notional purchase amount is $500 for three selected stocks, one third of the $500 notional purchase amount, or $166.67, is allocated to each of the selected stocks. The determination of the fractional quantity of stock may then be presented in the interface such that the user may easily ascertain a quantity of stock which the user owns upon completing of the bundle order. Completion may be initiated by pressing a "Place Order" button, or other suitable order submission user interface element.

FIG. 5D illustrates a user interface of an exemplary inventive methodology for purchasing and allocating stock bundle orders using a digital assets bundle ordering platform in accordance with one or more embodiments of the present disclosure. Upon placing the order, the user may be presented with an "Order Summary" interface. The "Order Summary" interface may present the user with a confirmation of, e.g., the selected stocks, the date, notional purchase amount, the allocation per selected stock, among any other suitable information. The user may also be present with options to, e.g., transfer the funds, track the order status of the ordered stocks, among other suitable post-purchase actions.

Figure 6:
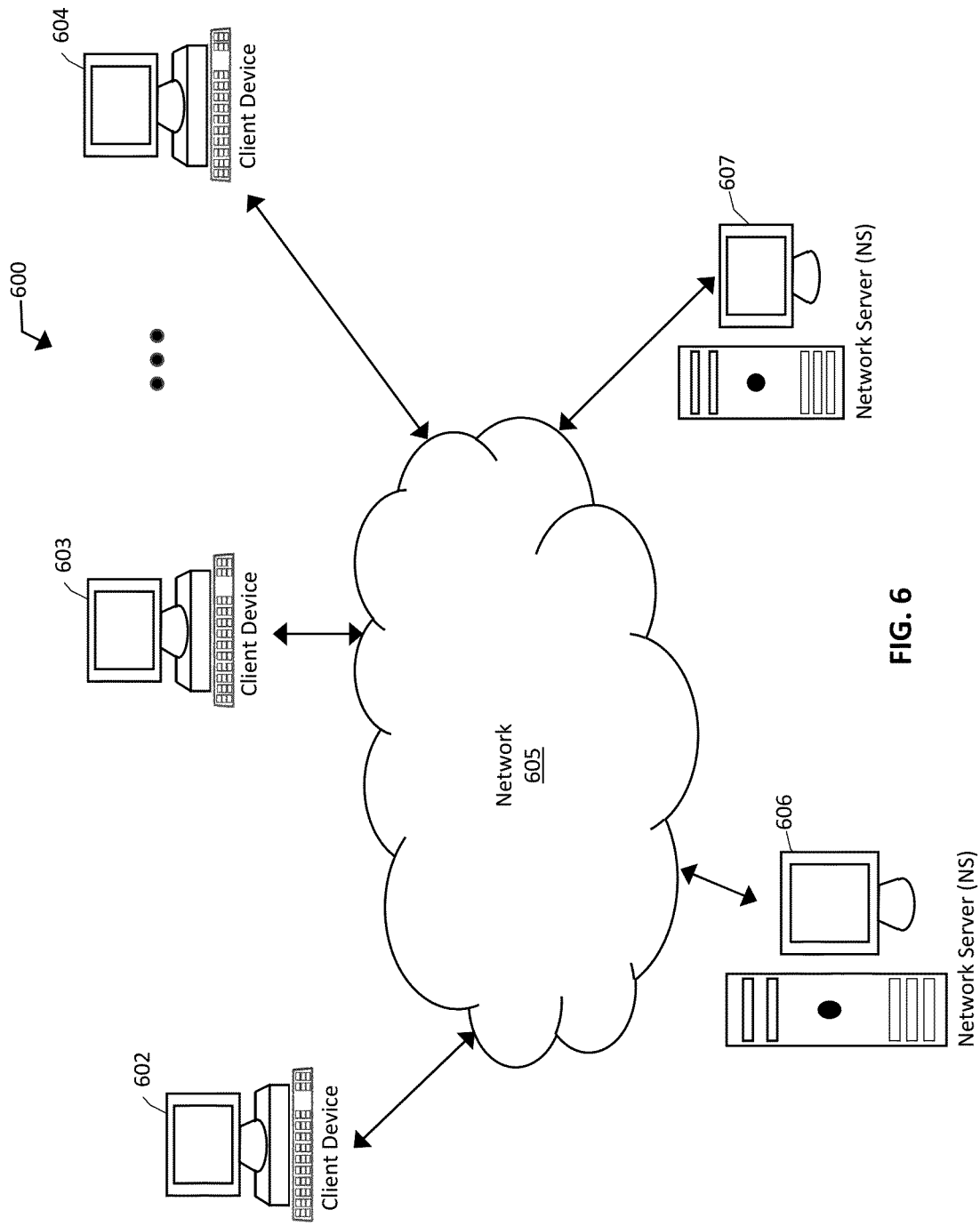

FIG. 6 depicts a block diagram of an exemplary computer-based system and/or platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices of the exemplary computer-based system/platform 600 may be configured to manage a large number of members and/or concurrent transactions, as detailed herein. In some embodiments, the exemplary computer-based system/platform 600 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 602-104 (e.g., clients) of the exemplary computer-based system/platform 600 may include virtually any computing device capable of receiving and sending a message over a network (e.g., cloud network), such as network 605, to and from another computing device, such as servers 606 and 607, each other, and the like. In some embodiments, the member devices 602-104 may be personal computers, multiprocessor systems, microprocessor-based or programmable consumer electronics, network PCs, and the like. In some embodiments, one or more member devices within member devices 602-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 602-104 may include may run one or more applications, such as Internet browsers, mobile applications, voice calls, video games, videoconferencing, and email, among others. In some embodiments, one or more member devices within member devices 602-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-104 may be specifically programmed by either Java, .Net, QT, C, C++ and/or other suitable programming language. In some embodiments, one or more member devices within member devices 602-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX)

forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 605 may also include mass storage, such as network attached storage (NAS), a storage area network (SAN), a content delivery network (CDN) or other forms of computer or machine-readable media.

In some embodiments, the exemplary server 606 or the exemplary server 607 may be a web server (or a series of servers) running a network operating system, examples of which may include but are not limited to Microsoft Windows Server, Novell NetWare, or Linux. In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 601-104.

In some embodiments and, optionally, in combination of any embodiment described above or below, for example, one or more exemplary computing member devices 602-104, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
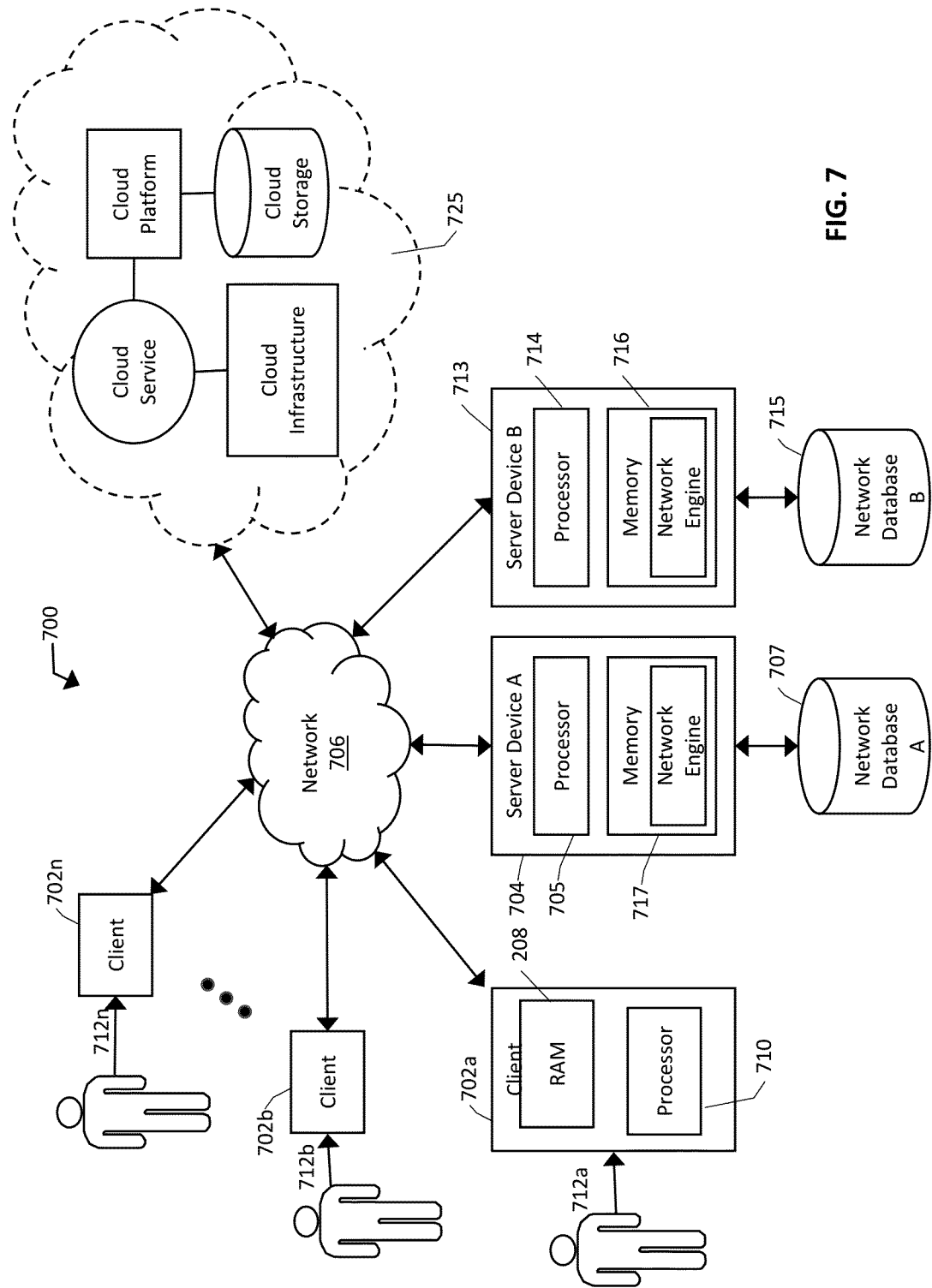

FIG. 7 depicts a block diagram of another exemplary computer-based system/platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702a, 702b thru 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a-n may also comprise a number of external or internal devices such as a mouse, a CD-ROM, DVD, a physical or virtual keyboard, a display, or other input or output devices. In some embodiments, examples of member computing devices 702a-n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a-n may be specifically programmed with one or more application programs in accordance with one or more principles/methodologies detailed herein. In some embodiments, member computing devices 702a-n may operate on any operating system capable of supporting a browser or browser-enabled application, such as Microsoft™, Windows™, and/or Linux. In some embodiments, member computing devices 702a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a-n, users, 712a-n, may communicate over the exemplary network 706 with each other and/or with other systems and/or devices coupled to the network 706. As shown in FIG. 7, exemplary server devices 704 and 713 may be also coupled to the network 706. In some embodiments, one or more member computing devices 702a-n may be mobile clients.

In some embodiments, at least one database of exemplary databases 707 and 7015 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
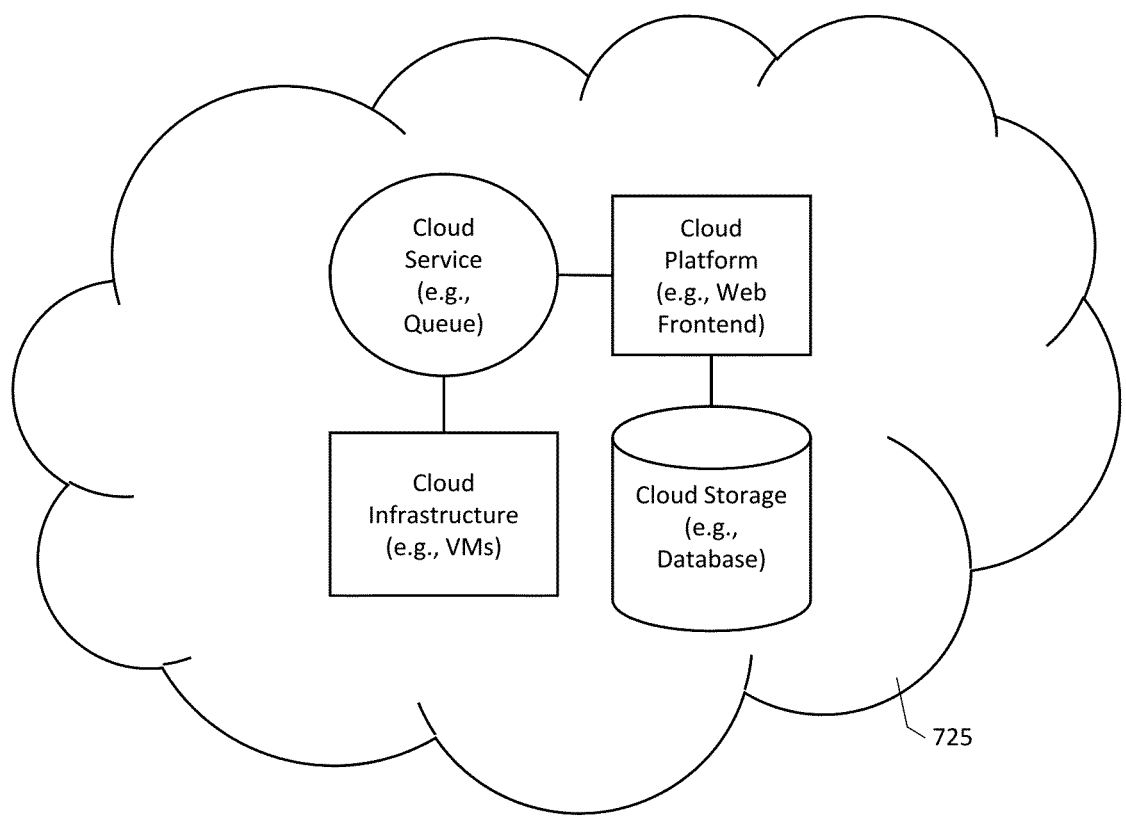
Figure 9:
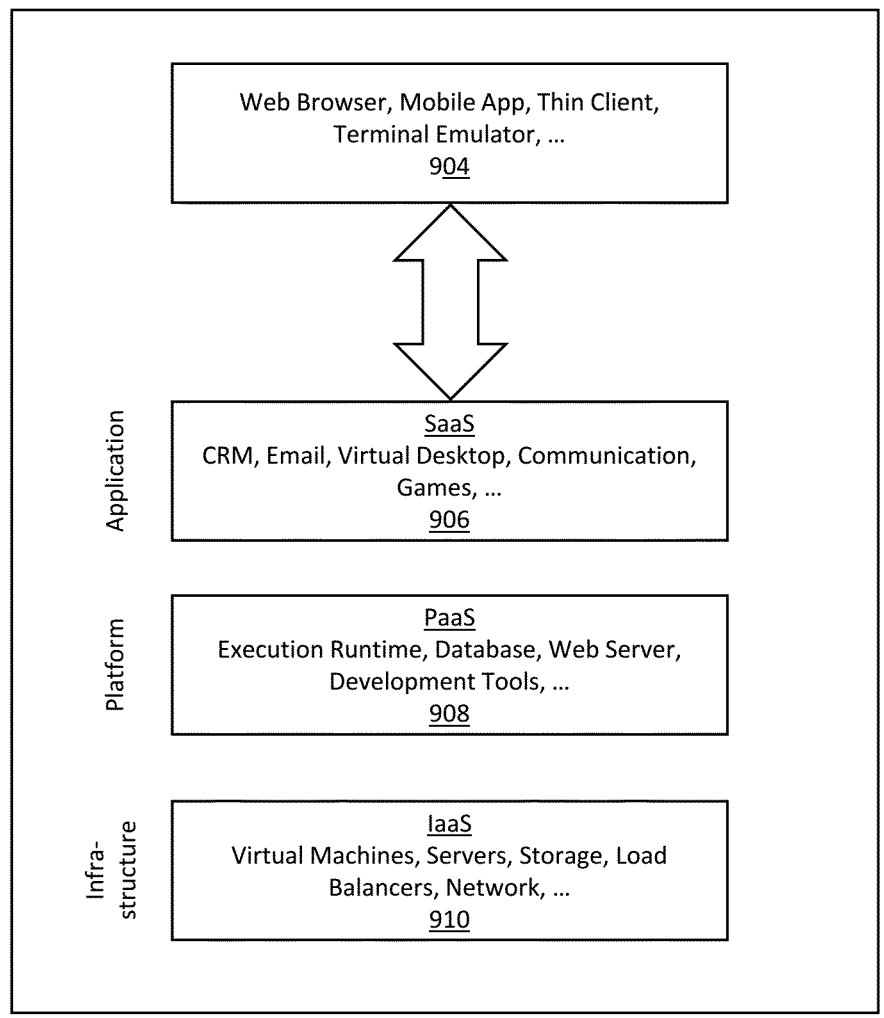

In some embodiments, the exemplary inventive computer-based systems and platforms of the present disclosure may be specifically configured to operate in a cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems and platforms of the present disclosure may be specifically configured to operate.

At least some aspects of the present disclosure will now be described with reference to the following numbered clauses.

1. A method comprising:
  causing to display, by the at least one processor of the digital assets bundle ordering platform, a digital assets bundle ordering graphical user interface on a screen of a computing device associated with a user;
  wherein the digital assets bundle ordering graphical user interface comprises a plurality of graphical user elements that are configured to allow the user to identify user-specific bundle data that comprises:
  i) a bundle of digital assets that the user desires to purchase,
  ii) a notional purchase amount that the user desires to spend for purchasing for the bundle, and
  iii) an allocation of the notional purchase amount among digital assets of the bundle;
  wherein the bundle of digital assets comprises:
  1) a first digital asset of a first asset type comprising a first digital representation of a first tradable asset,
  2) a second digital asset of a second asset type comprising a second digital representation of a second tradable asset, and
  3) a third digital asset of a third asset type comprising a third digital representation of a third tradable asset;
  receiving, by the at least one processor of the digital assets bundle ordering platform, the user-specific bundle data;
  allocating, by the at least one processor, the notional purchase amount among the first digital asset, the second digital asset, and the third digital asset, based on the allocation of the notional purchase amount among the digital assets of the bundle;
  electronically communicating, by the at least one processor, with at least one first external marketplace selling the first digital asset to determine a first number of whole ownership units of the first digital asset based on a respective portion of the notional purchase amount allocated to the first digital asset;
  electronically communicating, by the at least one processor, with at least one second external marketplace selling the second digital asset to determine a second number of whole ownership units of the second digital asset based on a respective portion of the notional purchase amount allocated to the second digital asset;
  electronically communicating, by the at least one processor, with at least one third external marketplace selling the third digital asset to determine a third number of whole ownership units of the third digital asset based on a respective portion of the notional purchase amount allocated to the third digital asset;
  electronically causing, by the at least one processor, to execute at least one first purchase order to purchase the first number of whole ownership units of the first digital asset;
  electronically causing, by the at least one processor, to execute at least one second purchase order to purchase the second number of whole ownership units of the second digital asset;
  electronically causing, by the at least one processor, to execute at least one third purchase order to purchase the third number of whole ownership units of the third digital asset;
  storing, by the at least one processor, in a firm account of at least one asset-tracking database, a first firm account data of the first number of whole ownership units of the first digital asset, a second firm account data of the second number of whole ownership units of the second digital asset, and a third firm account data of the third number of whole ownership units of the third digital asset;
  determining, by the at least one processor, a first user-specific ownership fraction in the first number of whole ownership units of the first digital asset based on the respective portion of the notional purchase amount allocated to the first digital asset;
  determining, by the at least one processor, a second user-specific ownership fraction in the second number of whole ownership units of the second digital asset based on the respective portion of the notional purchase amount allocated to the second digital asset;
  determining, by the at least one processor, a third user-specific ownership fraction in the third number of whole ownership units of the third digital asset based on the respective portion of the notional purchase amount allocated to the third digital asset;
  generating, by the at least one processor, a first asset-specific updatable allocation link between the first firm account data of the first number of whole ownership units of the first digital asset in the firm account and a first user-account data of the first user-specific ownership fraction in the first number of whole ownership units of the first digital asset in a user account of the user;
  generating, by the at least one processor, a second asset-specific updatable allocation link between the second firm account data of the second number of whole ownership units of the second digital asset in the firm account and a second user-account data of the second user-specific ownership fraction in the second number of whole ownership units of the second digital asset in a user account of the user;

generating, by the at least one processor, a third asset-specific updatable allocation link between the third firm account data of the third number of whole ownership units of the third digital asset in the firm account and a third user-account data of the third user-specific ownership fraction in the third number of whole ownership units of the third digital asset in a user account of the user;

tracking, by the at least one processor, the first user-specific ownership fraction in the first number of whole ownership units of the first digital asset based on the first asset-specific updatable allocation link;

tracking, by the at least one processor, the second user-specific ownership fraction in the second number of whole ownership units of the second digital asset based on the second asset-specific updatable allocation link; and tracking, by the at least one processor, the third user-specific ownership fraction in the third number of whole ownership units of the third digital asset based on the third asset-specific updatable allocation link.

2. The method of clause 1, further comprising:

programming, by the at least one processor, a gift card with at least one encodable indicia;

receiving, by the at least one processor of the digital assets bundle ordering platform, the at least one encodable indicia from the computing device associate with the user;

causing to display, by the at least one processor of the digital assets bundle ordering platform, the digital assets bundle ordering graphical user interface on the screen of the computing device associated with the user in response to the receiving the at least one encodable indicia; and populating, by the at least one processor of the digital assets bundle ordering platform, a respective graphical user element with the notional purchase amount based on the at least one encodable indicia.

3. The method of clause 2, wherein the gift card comprises a visual indication of the notional purchase amount.

4. The method of clause 1, wherein each of the first digital asset, the second tradeable asset, and the third tradeable asset is a respective stock; and wherein each of the first number of whole ownership units, the second number of whole ownership units, and the third number of whole ownership units are a share of each respective stock.

5. The method of clause 1, further comprising:

transmitting, by the at least one processor, each of the first digital asset, the second tradeable asset, and the third tradeable asset to an order aggregation service using an application programming interface (API); and wherein the order aggregation service determines first user-specific ownership fraction in the first number of whole ownership units, second user-specific ownership fraction in the second number of whole ownership units, and third user-specific ownership fraction in the third number of whole ownership units.

6. The method of clause 1, further comprising verifying, by the at least one processor, a risk level associated with the bundle of digital assets as below a threshold risk level.

7. The method of clause 6, further comprising:

sending, by the at least one processor via a fix gateway, the at least one first purchase order to the first external marketplace;

receiving, by the at least one processor via the fix gateway, the first number of whole ownership units of the first digital asset;

sending, by the at least one processor via a fix gateway, the at least one second purchase order to the second external marketplace;

receiving, by the at least one processor via the fix gateway, the second number of whole ownership units of the second digital asset;

sending, by the at least one processor via a fix gateway, the at least one third purchase order to the third external marketplace; and receiving, by the at least one processor via the fix gateway, the third number of whole ownership units of the third digital asset.

8. The method of clause 1, wherein two or more of the first external marketplace, the second external marketplace and third external marketplace can be a same external marketplace.

9. The method of clause 1, wherein two or more of the first asset type, the second asset type and third asset type can be a same asset type 10. A non-transitory computer readable medium having stored thereon software instructions that, when executed by a processor, cause the processor to generate control signals for executing the steps comprising:

causing to display, by the at least one processor of the digital assets bundle ordering platform, a digital assets bundle ordering graphical user interface on a screen of a computing device associated with a user;

wherein the digital assets bundle ordering graphical user interface comprises a plurality of graphical user elements that are configured to allow the user to identify user-specific bundle data that comprises:

i) a bundle of digital assets that the user desires to purchase, ii) a notional purchase amount that the user desires to spend for purchasing for the bundle, and iii) an allocation of the notional purchase amount among digital assets of the bundle;

wherein the bundle of digital assets comprises:

1) a first digital asset of a first asset type comprising a first digital representation of a first tradable asset, 2) a second digital asset of a second asset type comprising a second digital representation of a second tradable asset, and 3) a third digital asset of a third asset type comprising a third digital representation of a third tradable asset;

receiving, by the at least one processor of the digital assets bundle ordering platform, the user-specific bundle data;

allocating, by the at least one processor, the notional purchase amount among the first digital asset, the second digital asset, and the third digital asset, based on the allocation of the notional purchase amount among the digital assets of the bundle;

electronically communicating, by the at least one processor, with at least one first external marketplace selling the first digital asset to determine a first number of whole ownership units of the first digital asset based on a respective portion of the notional purchase amount allocated to the first digital asset;

electronically communicating, by the at least one processor, with at least one second external marketplace selling the second digital asset to determine a second number of whole ownership units of the second digital asset based on a respective portion of the notional purchase amount allocated to the second digital asset;

electronically communicating, by the at least one processor, with at least one third external marketplace selling the third digital asset to determine a third number of whole ownership units of the third digital asset based on a respective portion of the notional purchase amount allocated to the third digital asset;

electronically causing, by the at least one processor, to execute at least one first purchase order to purchase the first number of whole ownership units of the first digital asset;

electronically causing, by the at least one processor, to execute at least one second purchase order to purchase the second number of whole ownership units of the second digital asset;

electronically causing, by the at least one processor, to execute at least one third purchase order to purchase the third number of whole ownership units of the third digital asset;

storing, by the at least one processor, in a firm account of at least one asset-tracking database, a first firm account data of the first number of whole ownership units of the first digital asset, a second firm account data of the second number of whole ownership units of the second digital asset, and a third firm account data of the third number of whole ownership units of the third digital asset;

determining, by the at least one processor, a first user-specific ownership fraction in the first number of whole ownership units of the first digital asset based on the respective portion of the notional purchase amount allocated to the first digital asset;

determining, by the at least one processor, a second user-specific ownership fraction in the second number of whole ownership units of the second digital asset based on the respective portion of the notional purchase amount allocated to the second digital asset;

determining, by the at least one processor, a third user-specific ownership fraction in the third number of whole ownership units of the third digital asset based on the respective portion of the notional purchase amount allocated to the third digital asset;

generating, by the at least one processor, a first asset-specific updatable allocation link between the first firm account data of the first number of whole ownership units of the first digital asset in the firm account and a first user-account data of the first user-specific ownership fraction in the first number of whole ownership units of the first digital asset in a user account of the user;

generating, by the at least one processor, a second asset-specific updatable allocation link between the second firm account data of the second number of whole ownership units of the second digital asset in the firm account and a second user-account data of the second user-specific ownership fraction in the second number of whole ownership units of the second digital asset in a user account of the user;

generating, by the at least one processor, a third asset-specific updatable allocation link between the third firm account data of the third number of whole ownership units of the third digital asset in the firm account and a third user-account data of the third user-specific ownership fraction in the third number of whole ownership units of the third digital asset in a user account of the user;

tracking, by the at least one processor, the first user-specific ownership fraction in the first number of whole ownership units of the first digital asset based on the first asset-specific updatable allocation link;

tracking, by the at least one processor, the second user-specific ownership fraction in the second number of whole ownership units of the second digital asset based on the second asset-specific updatable allocation link; and tracking, by the at least one processor, the third user-specific ownership fraction in the third number of whole ownership units of the third digital asset based on the third asset-specific updatable allocation link.

11. A system, comprising:
at least one asset-tracking database, comprising:
a firm account for tracking tradeable assets;
at least one processor in communication with the at least one asset-tracking database, wherein the at least one processor is configured to:
cause to display a digital assets bundle ordering graphical user interface on a screen of a computing device associated with a user;
wherein the digital assets bundle ordering graphical user interface comprises a plurality of graphical user elements that are configured to allow the user to identify user-specific bundle data that comprises:
i) a bundle of digital assets that the user desires to purchase,
ii) a notional purchase amount that the user desires to spend for purchasing for the bundle, and
iii) an allocation of the notional purchase amount among digital assets of the bundle;
wherein the bundle of digital assets comprises:
1) a first digital asset of a first asset type comprising a first digital representation of a first tradable asset,
2) a second digital asset of a second asset type comprising a second digital representation of a second tradable asset, and
3) a third digital asset of a third asset type comprising a third digital representation of a third tradable asset;
receive the user-specific bundle data;
allocate the notional purchase amount among the first digital asset, the second digital asset, and the third digital asset, based on the allocation of the notional purchase amount among the digital assets of the bundle;
electronically communicate with at least one first external marketplace selling the first digital asset to determine a first number of whole ownership units of the first digital asset based on a respective portion of the notional purchase amount allocated to the first digital asset;
electronically communicate with at least one second external marketplace selling the second digital asset to determine a second number of whole ownership units of the second digital asset based on a respective portion of the notional purchase amount allocated to the second digital asset;
electronically communicate with at least one third external marketplace selling the third digital asset to determine a third number of whole ownership units of the third digital asset based on a respective portion of the notional purchase amount allocated to the third digital asset;
electronically cause to execute at least one first purchase order to purchase the first number of whole ownership units of the first digital asset;
electronically cause to execute at least one second purchase order to purchase the second number of whole ownership units of the second digital asset;
electronically cause to execute at least one third purchase order to purchase the third number of whole ownership units of the third digital asset;
store in a firm account of at least one asset-tracking database, a first firm account data of the first number of whole ownership units of the first digital asset, a second firm account data of the second number of whole ownership units of the second digital asset, and a third firm account data of the third number of whole ownership units of the third digital asset;
determine a first user-specific ownership fraction in the first number of whole ownership units of the first digital asset based on the respective portion of the notional purchase amount allocated to the first digital asset;
determine a second user-specific ownership fraction in the second number of whole ownership units of the second digital asset based on the respective portion of the notional purchase amount allocated to the second digital asset;
determine a third user-specific ownership fraction in the third number of whole ownership units of the third digital asset based on the respective portion of the notional purchase amount allocated to the third digital asset;
generate a first asset-specific updatable allocation link between the first firm account data of the first number of whole ownership units of the first digital asset in the firm account and a first user-account data of the first user-specific ownership fraction in the first number of whole ownership units of the first digital asset in a user account of the user;
generate a second asset-specific updatable allocation link between the second firm account data of the second number of whole ownership units of the second digital asset in the firm account and a second user-account data of the second user-specific ownership fraction in the second number of whole ownership units of the second digital asset in a user account of the user;
generate a third asset-specific updatable allocation link between the third firm account data of the third number of whole ownership units of the third digital asset in the firm account and a third user-account data of the third user-specific ownership fraction in the third number of whole ownership units of the third digital asset in a user account of the user;
track the first user-specific ownership fraction in the first number of whole ownership units of the first digital asset based on the first asset-specific updatable allocation link;
track the second user-specific ownership fraction in the second number of whole ownership units of the second digital asset based on the second asset-specific updatable allocation link; and
track the third user-specific ownership fraction in the third number of whole ownership units of the third digital asset based on the third asset-specific updatable allocation link.

12. The system of clause 11, wherein the at least one processor is further configured to:
Program a gift card with at least one encodable indicia;
Receive the at least one encodable indicia from the computing device associate with the user;
cause to display the digital assets bundle ordering graphical user interface on the screen of the computing device associated with the user in response to the receiving the at least one encodable indicia; and
populate a respective graphical user element with the notional purchase amount based on the at least one encodable indicia.

13. The system of clause 12, wherein the gift card comprises a visual indication of the notional purchase amount.

14. The system of clause 11, wherein each of the first digital asset, the second tradeable asset, and the third tradeable asset is a respective stock; and wherein each of the first number of whole ownership units, the second number of whole ownership units, and the third number of whole ownership units are a share of each respective stock.

15. The system of clause 11, wherein the at least one processor is further configured to:
transmitting, by the at least one processor, each of the first digital asset, the second tradeable asset, and the third tradeable asset to an order aggregation service using an application programming interface (API); and
wherein the order aggregation service determines first user-specific ownership fraction in the first number of whole ownership units, second user-specific ownership fraction in the second number of whole ownership units, and third user-specific ownership fraction in the third number of whole ownership units.

16. The system of clause 11, wherein the at least one processor is further configured to verify a risk level associated with the bundle of digital assets as below a threshold risk level.

17. The system of clause 16, further comprising:
send, via a fix gateway, the at least one first purchase order to the first external marketplace;
receive, via the fix gateway, the first number of whole ownership units of the first digital asset;
send, via a fix gateway, the at least one second purchase order to the second external marketplace;
receive, via the fix gateway, the second number of whole ownership units of the second digital asset;
send, via a fix gateway, the at least one third purchase order to the third external marketplace; and
receive, via the fix gateway, the third number of whole ownership units of the third digital asset.

18. The system of clause 11, wherein two or more of the first external marketplace, the second external marketplace and third external marketplace can be a same external marketplace.

19. The system of clause 11, wherein two or more of the first asset type, the second asset type and third asset type can be a same asset type 20. The system of clause 11, further comprising an event source database configured to maintain a log of changes to the user-specific bundle data.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
instructing, by at least one processor of a digital assets bundle ordering platform, a computing device associated with a user to display a digital assets bundle ordering graphical user interface on a screen of the computing device;
wherein the digital assets bundle ordering graphical user interface comprises a plurality of graphical user elements that are configured to allow the user to identify user-specific bundle data that comprises:

i) a stock bundle that the user desires to purchase,
ii) a notional purchase amount that the user desires to spend for purchasing for the stock bundle, and
iii) an allocation of the notional purchase amount in the stock bundle;
wherein the stock bundle comprises:
1) a first stock of a first publicly traded company,
2) a second stock of a second publicly traded company, and
3) a third stock of a third publicly traded company;
wherein the first publicly traded company, the second publicly traded company, and the third publicly traded company are different companies;
receiving, by the at least one processor of the digital assets bundle ordering platform, the user-specific bundle data;
determining, by the at least one processor, whether each stock in the stock bundle is an approved stock or a disapproved stock based on the user-specific bundle data and at least one rule of one of a credit standard or a risk standard;
automatically removing, by the at least one processor, the disapproved stock from the stock bundle of the user-specific bundle data and reconfiguring the plurality of graphical user elements on the screen of the computing device associated with the user so as to allow the user to:
i) add at least one other stock to replace the disapproved stock,
ii) remove the disapproved stock and automatically adjust the notional purchase amount,
iii) remove the disapproved stock and automatically adjust the allocation of notional purchase amount, or
iv) cancel a purchase of the stock bundle;
when the first stock, the second stock and the third stock are approved stocks:
allocating, by the at least one processor, in real-time, the notional purchase amount among the first stock, the second stock, and the third stock, based on the allocation of the notional purchase amount;
determining, by the at least one processor, in real-time, using at least one first external marketplace selling the first stock, a first fractional ownership unit number of the first stock based on a first portion of the notional purchase amount allocated to the first stock;
determining, by the at least one processor, in real-time, using at least one second external marketplace selling the second stock, a second fractional ownership unit number of the second stock based on a second portion of the notional purchase amount allocated to the second stock;
determining, by the at least one processor, in real-time, using at least one third external marketplace selling the third stock, a third fractional ownership unit number of the third stock based on a third portion of the notional purchase amount allocated to the third stock;
determining, by the at least one processor, in real-time, a first whole ownership unit number of the first stock based on rounding up of the first fractional ownership unit number;
determining, by the at least one processor, in real-time, a second whole ownership unit number of the second stock based on rounding up of the second fractional ownership unit number;
determining, by the at least one processor, in real-time, a third whole ownership unit number of the third stock based on a rounding up of the third fractional ownership unit number;
generating, by the at least one processor, in real-time, a first order;
wherein the first order comprises a first data object, comprising:
a digital representation of the first fractional ownership unit number of the first stock,
a digital representation of a first firm portion of the first whole ownership unit number of the first stock based on the first fractional ownership unit number,
a first user-specific updatable allocation digital link between the digital representation of the first fractional ownership unit number of the first stock and a user account of the user, and
a first firm-specific updatable allocation digital link between the digital representation of the first firm portion of the first whole ownership unit number of the first stock and a firm account of the firm;
generating, by the at least one processor, in real-time, a second order;
wherein the second order comprises a second data object, specifying:
a digital representation of the second fractional ownership unit number of the second stock,
a digital representation of a second firm portion of the second whole ownership unit number of the second stock based on the second fractional ownership unit number,
a second user-specific updatable allocation digital link between the digital representation of the second fractional ownership unit number of the second stock and the user account of the user, and
a second firm-specific updatable allocation digital link between the digital representation of the second firm portion of the second whole ownership unit number of the second stock and the firm account of the firm;
generating, by the at least one processor, in real-time, a third order;
wherein the third order comprises a third data object, specifying:
a digital representation of the third fractional ownership unit number,
a digital representation of a third firm portion of the third whole ownership unit number based on the third fractional ownership unit number,
a third user-specific updatable allocation digital link between the digital representation of the third fractional ownership unit number of the third stock and the user account of the user, and
a third firm-specific updatable allocation digital link between the digital representation of the third firm portion of the third whole ownership unit number of the third stock and the firm account of the firm;
adding, by the at least one processor, the first data object of the first order, the second data object of the second order, and the third object of the third order to an event sourcing database;
utilizing, by the at least one processor, the event sourcing database to execute, in real-time, at least one first purchase order on the at least one first external marketplace selling the first stock to purchase, based on the first order, the first whole ownership unit number of the first stock;

utilizing, by the at least one processor, the event sourcing database to execute, in real-time, at least one second purchase order on the at least one second external marketplace selling the second stock to purchase, based on the second order, the second whole ownership unit number of the second stock;

utilizing, by the at least one processor, the event sourcing database to execute, in real-time, at least one third purchase order on the at least one third external marketplace selling the third stock to purchase, based on the at least one third order, the third whole ownership unit number of the third stock;

modifying, by the at least one processor, the event sourcing database to update:

the first data object with a first stock ownership data regarding the first whole ownership unit number of the first stock so as to generate a first verifiable stock ownership record of a direct ownership of the first fractional ownership unit number of the first stock by the user, the second data object with a second stock ownership data regarding the second whole ownership unit number of the second stock so as to generate a second verifiable stock ownership record of a direct ownership of the second fractional ownership unit number of the second stock by the user, and the third data object with a third stock ownership data regarding the third whole ownership unit number of the third stock so as to generate a third verifiable third verifiable stock ownership record of a direct ownership of the third fractional ownership unit number of the third stock by the user;

permitting, by the at least one processor, the user to execute in real-time, at a first time, a first sale of the first fractional ownership unit number of the first stock, by:

identifying, based on the first verifiable stock ownership record of the first data object of the event sourcing database, the first whole ownership unit number of the first stock to sell and utilizing the first user-specific updatable allocation digital link and the first firm-specific updatable allocation digital link to update the user account and the firm account based on the first sale;

permitting, by the at least one processor, the user to execute in real-time, at a second time, a second sale of the second fractional ownership unit number of the second stock, by:

identifying, based on the second verifiable stock ownership record of the second data object of the event sourcing database, the second whole ownership unit number of the second stock to sell and utilizing the second user-specific updatable allocation digital link and the second firm-specific updatable allocation digital link to update the user account and the firm account based on the second sale;

permitting, by the at least one processor, the user to execute in real-time, at a third time, a third sale of the third fractional ownership unit number of the third stock, by:

identifying, based on the third verifiable stock ownership record of the third data object of the event sourcing database, the third whole ownership unit number of the third stock to sell and utilizing the third user-specific updatable allocation digital link and the third firm-specific updatable allocation digital link to update the user account and the firm account based on the third sale; and wherein the first time, the second time, and the third time are different times.

2. The method of claim 1, further comprising:

receiving, by the at least one processor of the digital assets bundle ordering platform, gift card data of a gift card; wherein the gift card data comprises at least one encoded indicia;

receiving, by the at least one processor of the digital assets bundle ordering platform, the at least one encoded indicia from the computing device associated with the user;

causing to display, by the at least one processor of the digital assets bundle ordering platform, the digital assets bundle ordering graphical user interface on the screen of the computing device associated with the user in response to receiving the at least one encoded indicia; and populating, by the at least one processor of the digital assets bundle ordering platform, a respective graphical user element with the notional purchase amount based on the at least one encoded indicia.

3. The method of claim 2, further comprising:

determining, by the at least one processor of the digital assets bundle ordering platform, the stock bundle based on a predetermined gift card bundle associated with the gift card.

4. The method of claim 1, further comprising:

transmitting, by the at least one processor of the digital assets bundle ordering platform, the stock bundle to an order aggregation service using an application programming interface (API); and wherein the order aggregation service determines the first fractional ownership unit number, the second fractional ownership unit number, and the third fractional ownership unit number.

5. The method of claim 1, wherein the risk standard identifies a threshold risk level.

6. The method of claim 5, further comprising:

sending, by the at least one processor, via a fix gateway, the at least one first purchase order to the first external marketplace;

receiving, by the at least one processor, via the fix gateway, the first whole ownership unit number of the first stock;

sending, by the at least one processor via a fix gateway, the at least one second purchase order to the second external marketplace;

receiving, by the at least one processor via the fix gateway, the second whole ownership unit number of the second stock;

sending, by the at least one processor via a fix gateway, the at least one third purchase order to the third external marketplace; and receiving, by the at least one processor via the fix gateway, the third whole ownership unit number of the third stock.

7. The method of claim 1, wherein two or more of the first external marketplace, the second external marketplace and third external marketplace can be a same external marketplace.

8. A non-transitory computer readable medium having stored thereon software instructions that, when executed by a processor, cause a processor to at least:
- instruct to display a digital assets bundle ordering graphical user interface on a screen of a computing device associated with a user;
  - wherein the digital assets bundle ordering graphical user interface comprises a plurality of graphical user elements that are configured to allow the user to identify user-specific bundle data that comprises:
    - i) a stock bundle that the user desires to purchase,
    - ii) a notional purchase amount that the user desires to spend for purchasing for the stock bundle, and
    - iii) an allocation of the notional purchase amount in the stock bundle;
    - wherein the stock bundle comprises:
      1) a first stock,
      2) a second stock, and
      3) a third stock;
- receive the user-specific bundle data;
- allocate, in real-time, the notional purchase amount among the first stock, the second stock, and the third stock, based on the allocation of the notional purchase amount;
- determine, in real-time, using at least one first external marketplace selling the first stock, a first fractional ownership unit number of the first stock based on a first portion of the notional purchase amount allocated to the first stock;
- determine, in real-time, using at least one second external marketplace selling the second stock, a second fractional ownership unit number of the second stock based on a second portion of the notional purchase amount allocated to the second stock;
- determine, in real-time, using at least one third external marketplace selling the third stock, a third fractional ownership unit number of the third stock based on a third portion of the notional purchase amount allocated to the third stock;
- determine, in real-time, a first whole ownership unit number of the first stock based on rounding up of the first fractional ownership unit number;
- determine, in real-time, a second whole ownership unit number of the second stock based on rounding up of the second fractional ownership unit number;
- determine, in real-time, a third whole ownership unit number of the third stock based on a rounding up of the third fractional ownership unit number;
- generate, in real-time, a first order;
  - wherein the first order comprises a first data object, comprising:
    - a digital representation of the first fractional ownership unit number of the first stock,
    - a digital representation of a first firm portion of the first whole ownership unit number of the first stock based on the first fractional ownership unit number,
    - a first user-specific updatable allocation digital link between the digital representation of the first fractional ownership unit number of the first stock and a user account of the user, and
    - a first firm-specific updatable allocation digital link between the digital representation of the first firm portion of the first whole ownership unit number of the first stock and a firm account of the firm;
- generate, in real-time, a second order;
  - wherein the second order comprises a second data object, specifying:
    - a digital representation of the second fractional ownership unit number of the second stock,
    - a digital representation of a second firm portion of the second whole ownership unit number of the second stock based on the second fractional ownership unit number,
    - a second user-specific updatable allocation digital link between the digital representation of the second fractional ownership unit number of the second stock and the user account of the user, and
    - a second firm-specific updatable allocation digital link between the digital representation of the second firm portion of the second whole ownership unit number of the second stock and the firm account of the firm;
- generate, in real-time, a third order;
  - wherein the third order comprises a third data object, specifying:
    - a digital representation of the third fractional ownership unit number,
    - a digital representation of a third firm portion of the third whole ownership unit number based on the third fractional ownership unit number,
    - a third user-specific updatable allocation digital link between the digital representation of the third fractional ownership unit number of the third stock and the user account of the user, and
    - a third firm-specific updatable allocation digital link between the digital representation of the third firm portion of the third whole ownership unit number of the third stock and the firm account of the firm;
- add the first data object of the first order, the second data object of the second order, and the third object of the third order to an event sourcing database;
- utilize the event sourcing database, to execute, in real-time, at least one first purchase order on the at least one first external marketplace selling the first stock to purchase, based on the first order, the first whole ownership unit number of the first stock;
- utilize the event sourcing database, to execute, in real-time, at least one second purchase order on the at least one second external marketplace selling the second stock to purchase, based on the second order, the second whole ownership unit number of the second stock;
- utilize the event sourcing database to execute, in real-time, at least one third purchase order on the at least one third external marketplace selling the third stock to purchase, based on the at least one third order, the third whole ownership unit number of the third stock;
- modify the event sourcing database to update:
  - the first data object with a first stock ownership data regarding the first whole ownership unit number of the first stock so as to generate a first verifiable stock ownership record of a direct ownership of the first fractional ownership unit number of the first stock by the user,
  - the second data object with a second stock ownership data regarding the second whole ownership unit number of the second stock so as to generate a second verifiable stock ownership record of a direct ownership of the second fractional ownership unit number of the second stock by the user, and the third data object with a third stock ownership data regarding the third whole ownership unit number of the third stock so as to generate a third verifiable third verifiable stock ownership record of a direct ownership of the third fractional ownership unit number of the third stock by the user;

permit the user to execute in real-time, at a first time, a first sale of the first fractional ownership unit number of the first stock, by:
- identifying, based on the first verifiable stock ownership record of the first data object of the event sourcing database, the first whole ownership unit number of the first stock and
- utilizing the first user-specific updatable allocation digital link and the first firm-specific updatable allocation digital link to update the user account and the firm account based on the first sale;

permit the user to execute in real-time, at a second time, a second sale of the second fractional ownership unit number of the second stock, by:
- identifying, based on the second verifiable stock ownership record of the second data object of the event sourcing database, the second whole ownership unit number of the second digital asset to sell and
- utilizing the second user-specific updatable allocation digital link and the second firm-specific updatable allocation digital link to update the user account and the firm account based on the second sale;

permit the user to execute in real-time, at a third time, a third sale of the third fractional ownership unit number of the third stock, by:
- identifying, based on the third verifiable stock ownership record of the third data object of the event sourcing database, the third whole ownership unit number of the third digital asset to sell and
- utilizing the third user-specific updatable allocation digital link and the third firm-specific updatable allocation digital link to update the user account and the firm account based on the third sale; and wherein the first time, the second time, and the third time are different times.

9. A system comprising:

at least one asset-tracking database, comprising:

a firm account for tracking tradeable assets;

at least one processor in communication with the at least one asset-tracking database, wherein the at least one processor is configured to:
- instruct a computing device associated with a user to display a digital assets bundle ordering graphical user interface on a screen of the computing device;
  - wherein the digital assets bundle ordering graphical user interface comprises a plurality of graphical user elements that are configured to allow the user to identify user-specific bundle data that comprises:
    - i) a stock bundle that the user desires to purchase,
    - ii) a notional purchase amount that the user desires to spend for purchasing for the stock bundle, and
    - iii) an allocation of the notional purchase amount in the stock bundle;
  - wherein the stock bundle comprises:
    - 1) a first stock,
    - 2) a second stock, and
    - 3) a third stock;
- receive the user-specific bundle data;
- allocate, in real-time, the notional purchase amount among the first stock, the second stock, and the third stock, based on the allocation of the notional purchase amount;
- determine, in real-time, using at least one first external marketplace selling the first stock, a first fractional ownership unit number of the first stock based on a first portion of the notional purchase amount allocated to the first stock;
- determine, in real-time, using at least one second external marketplace selling the second stock, a second fractional ownership unit number of the second stock based on a second portion of the notional purchase amount allocated to the second stock;
- determine, in real-time, using at least one third external marketplace selling the third stock, a third fractional ownership unit number of the third stock based on a third portion of the notional purchase amount allocated to the third stock;
- determine, in real-time, a first whole ownership unit number of the first stock based on rounding up of the first fractional ownership unit number;
- determine, in real-time, a second whole ownership unit number of the second stock based on rounding up of the second fractional ownership unit number;
- determine, in real-time, a third whole ownership unit number of the third stock based on rounding up of the third fractional ownership unit number;
- generate, in real-time, a first order;
  - wherein the first order comprises a first data object, comprising:
    - a digital representation of the first fractional ownership unit number of the first stock,
    - a digital representation of a first firm portion of the first whole ownership unit number of the first stock based on the first fractional ownership unit number,
    - a first user-specific updatable allocation digital link between the digital representation of the first fractional ownership unit number of the first stock and a user account of the user, and
    - a first firm-specific updatable allocation digital link between the digital representation of the first firm portion of the first whole ownership unit number of the first stock and a firm account of the firm;
- generate, in real-time, a second order;
  - wherein the second order comprises a second data object, specifying:
    - a digital representation of the second fractional ownership unit number of the second stock,
    - a digital representation of a second firm portion of the second whole ownership unit number of the second stock based on the second fractional ownership unit number,
    - a second user-specific updatable allocation digital link between the digital representation of the second fractional ownership unit number of the second stock and the user account of the user, and
    - a second firm-specific updatable allocation digital link between the digital representation of the second firm portion of the second whole ownership unit number of the second stock and the firm account of the firm;

generate, in real-time, a third order;
   wherein the third order comprises a third data object, specifying:
      a digital representation of the third fractional ownership unit number,
      a digital representation of a third firm portion of the third whole ownership unit number based on the third fractional ownership unit number,
      a third user-specific updatable allocation digital link between the digital representation of the third fractional ownership unit number of the third stock and the user account of the user, and
      a third firm-specific updatable allocation digital link between the digital representation of the third firm portion of the third whole ownership unit number of the third stock and the firm account of the firm;
add the first data object of the first order, the second data object of the second order, and the third object of the third order to an event sourcing database;
utilize the event sourcing database to execute, in real-time, at least one first purchase order on the at least one first external marketplace selling the first stock to purchase, based on the first order, the first whole ownership unit number of the first stock;
utilize the event sourcing database to execute, in real-time, at least one second purchase order on the at least one second external marketplace selling the second stock to purchase, based on the second order, the second whole ownership unit number of the second stock;
utilize the event sourcing database to execute, in real-time, at least one third purchase order on the at least one third external marketplace selling the third stock to purchase, based on the third order, the third whole ownership unit number of the third stock;
modify the event sourcing database to update:
   the first data object with a first stock ownership data regarding the first whole ownership unit number of the first stock so as to generate a first verifiable stock ownership record of a direct ownership of the first fractional ownership unit number of the first stock by the user,
   the second data object with a second stock ownership data regarding the second whole ownership unit number of the second stock so as to generate a second verifiable stock ownership record of a direct ownership of the second fractional ownership unit number of the second stock by the user, and
   the third data object with a third stock ownership data regarding the third whole ownership unit number of the third stock so as to generate a third verifiable third verifiable stock ownership record of a direct ownership of the third fractional ownership unit number of the third stock by the user;
permit the user to execute, in real-time, at a first time, a first sale of the first fractional ownership unit number of the first stock, by:
   identifying, based on the first verifiable stock ownership record of the first data object of the event sourcing database, the first whole ownership unit number of the first stock to sell and utilizing the first user-specific updatable allocation digital link and the first firm-specific updatable allocation digital link to update the user account and the firm account based on the first sale;
permit the user to execute, in real-time, at a second time, a second sale of the second fractional ownership unit number of the second stock, by:
   identifying, based on the second verifiable stock ownership record of the second data object of the event sourcing database, the second whole ownership unit number of the second stock to sell and utilizing the second user-specific updatable allocation digital link and the second firm-specific updatable allocation digital link to update the user account and the firm account based on the second sale;
permit the user to execute, in real-time, at a third time, a third sale of the third fractional ownership unit number of the third stock, by:
   identifying, based on the third verifiable stock ownership record of the third data object of the event sourcing database, the third whole ownership unit number of the third stock to sell and utilizing the third user-specific updatable allocation digital link and the third firm-specific updatable allocation digital link to update the user account and the firm account based on the third sale; and
   wherein the first time, the second time, and the third time are different times.

10. The system of claim 9, wherein the at least one processor is further configured to:
   receive gift card data of a gift card;
      wherein the gift card data comprises at least one encoded indicia;
   receive the at least one encoded indicia from the computing device associate with the user;
   cause to display the digital assets bundle ordering graphical user interface on the screen of the computing device associated with the user in response to receiving the at least one encoded indicia; and
   populate a respective graphical user element with the notional purchase amount based on the at least one encoded indicia.

11. The system of claim 10, wherein the at least one processor is further configured to
   determine the stock bundle based on a predetermined gift card bundle associated with the gift card.

12. The system of claim 9, wherein the at least one processor is further configured to:
   transmit the stock bundle to an order aggregation service using an application programming interface (API); and
   wherein the order aggregation service determines the first fractional ownership unit number, the second fractional ownership unit number, and the third fractional ownership unit number.

13. The system of claim 9, wherein the at least one processor is further configured to:
   verify that a risk level associated with the stock bundle is below a threshold risk level.

14. The system of claim 13, wherein the at least one processor is further configured to:
   send, via a fix gateway, the at least one first purchase order to the first external marketplace;
   receive, via the fix gateway, the first whole ownership unit number of the first stock;
   send, via a fix gateway, the at least one second purchase order to the second external marketplace;
   receive, via the fix gateway, the second whole ownership unit number of the second stock;
   send, via a fix gateway, the at least one third purchase order to the third external marketplace; and receive, via the fix gateway, the third whole ownership unit number of the third stock.

15. The system of claim 9, wherein two or more of the first external marketplace, the second external marketplace and third external marketplace can be a same external marketplace.

16. The system of claim 9, further comprising an event source database configured to maintain a log of changes to the user-specific bundle data.

17. The method of claim 1, wherein the method further comprising:
   permitting, by the at least one processor, the user, to exercise a first voting right in the first stock when the first fractional ownership unit number of the first stock comprises at least one whole ownership unit of the first stock;
   permitting, by the at least one processor, the user, to exercise a second voting right in the second stock when the second fractional ownership unit number of the second stock comprises at least one whole ownership unit of the second stock; and
   permitting, by the at least one processor, the user, to exercise a third voting right in the third stock when the third fractional ownership unit number of the third stock comprises at least one whole ownership unit of the third stock.

18. The system of claim 9, wherein the at least one processor is further configured to:
   permit the user to exercise a first voting right in the first stock when the first fractional ownership unit number of the first stock comprises at least one whole ownership unit of the first stock;
   permit the user to exercise a second voting right in the second stock when the second fractional ownership unit number of the second stock comprises at least one whole ownership unit of the second stock; and
   permit the user to exercise a third voting right in the third stock when the third fractional ownership unit number of the third stock comprises at least one whole ownership unit of the third stock.

* * * * *